US010771959B2

(12) United States Patent
Grunewald et al.

(10) Patent No.: US 10,771,959 B2
(45) Date of Patent: Sep. 8, 2020

(54) RECOMMENDING APPLICATIONS USING SOCIAL NETWORKING INFORMATION

(71) Applicant: Facebook, Inc., Menlo Park, CA (US)

(72) Inventors: Calvin Patrick Grunewald, Issaquah, WA (US); Ievgenii Nazaruk, Fremont, CA (US); Ragavan Srinivasan, Cupertino, CA (US)

(73) Assignee: FACEBOOK, INC., Menlo Park, CA (US)

( * ) Notice: Subject to any disclaimer, the term of this patent is extended or adjusted under 35 U.S.C. 154(b) by 554 days.

(21) Appl. No.: 15/173,370

(22) Filed: Jun. 3, 2016

(65) Prior Publication Data
US 2017/0351388 A1 Dec. 7, 2017

(51) Int. Cl.
| G06F 3/00 | (2006.01) |
| H04W 8/22 | (2009.01) |
| H04W 4/60 | (2018.01) |
| G06Q 50/00 | (2012.01) |
| H04M 1/725 | (2006.01) |
| H04W 8/24 | (2009.01) |
| G06F 8/61 | (2018.01) |
| G06F 3/0488 | (2013.01) |

(52) U.S. Cl.
CPC .............. *H04W 8/22* (2013.01); *G06Q 50/01* (2013.01); *H04M 1/72525* (2013.01); *H04W 4/60* (2018.02); *G06F 3/0488* (2013.01); *G06F 8/61* (2013.01); *H04W 8/245* (2013.01)

(58) Field of Classification Search
None
See application file for complete search history.

(56) References Cited

U.S. PATENT DOCUMENTS

| 8,468,164 B1* | 6/2013 | Paleja | G06F 17/30867 707/767 |
| 2010/0306762 A1* | 12/2010 | Lindberg | G06F 8/61 717/176 |
| 2013/0346268 A1* | 12/2013 | Pereira | G06Q 10/10 705/34 |
| 2014/0244745 A1* | 8/2014 | Murarka | H04L 67/22 709/294 |
| 2015/0067099 A1* | 3/2015 | Martin | H04L 67/10 709/217 |

(Continued)

OTHER PUBLICATIONS

Donghwan bae et al., App Trends: A Graph-based Mobile App Recommendation System Using Usage History, Feb. 1, 2015, IEEE, pp. 210-215 (Year: 2015).*

(Continued)

*Primary Examiner* — Tam T Tran
(74) *Attorney, Agent, or Firm* — Keller Jolley Preece

(57) ABSTRACT

The present disclosure is directed toward systems and methods for generating application recommendations to provide to a user of a mobile device. For instance, the systems and methods use social networking information to identify applications that may be of interest to the user, and present application recommendations to the user at various contact points on the mobile device. The present disclosure is also directed toward systems and methods for managing the download and installation of selected applications on a mobile device such that a presentation focus on an application does not change during a download and installation process.

20 Claims, 15 Drawing Sheets

(56) References Cited

U.S. PATENT DOCUMENTS

| | | | |
|---|---|---|---|
| 2015/0106801 A1* | 4/2015 | Agrawal | G06F 8/60 717/177 |
| 2016/0171589 A1* | 6/2016 | Glover | G06Q 30/0631 705/26.7 |
| 2016/0188308 A1* | 6/2016 | Machalani | G06F 9/451 717/178 |
| 2017/0269916 A1* | 9/2017 | Singhal | G06F 8/61 |

OTHER PUBLICATIONS

Gerald Eichler at al., Recommendation as a Service (RaaS), Oct. 1, 2013, International Conference on Intelligence in Next Generation Networks, pp. 1-8 (Year: 2013).*

\* cited by examiner

RECOMMENDING APPLICATIONS USING SOCIAL NETWORKING INFORMATION

BACKGROUND

1. Technical Field

One or more embodiments disclosed herein relate generally to a social networking system. More specifically, one or more embodiments disclosed herein relate to application recommendations in association with a social networking system.

2. Background and Relevant Art

The use of mobile devices is ubiquitous among modern computer users. Indeed, large segments of computer users perform the majority of their computing tasks via one or more mobile devices. For example, it is common for a computer user to utilize a smart phone or tablet to access the Internet, play video games, compose electronic documents, send instant messages and email, and so forth. In many cases, it is not uncommon for a modern computer user to completely forego the use of traditional computing devices such as desktop and laptop computers.

The functionality of a typical mobile computing device is expanded as the user of the mobile device installs additional applications on the mobile device. For example, a manufacturer of a typical mobile device generally ships a mobile device with a default or factory configuration that includes basic capabilities. The mobile device user can then download various additional applications onto the mobile device that enable the user to play video games, engage in electronic communications and social media, create electronic documents, and so forth.

The process of installing new applications on a mobile device is often problematic. For example, a user may have a hard time knowing which application is best suited to the user's needs. In this case, the user may spend large amounts of time searching through application repository programs looking for a suitable application to download and install on the mobile device. The process of searching for a suitable application is generally complicated by the fact that there are often many applications available that appear to offer the same functionality. For instance, the user may search for an application to play the card game "Solitaire" on the user's smart phone. When searching through an application repository program for an appropriate Solitaire application, the user may find dozens of available applications that advertise the ability to allow the user to play that particular card game. Frequently, when faced with this situation, users become frustrated because they have little to no guidance as to which particular application to select.

In some cases, one application or program installed on a mobile device may provide a user with sponsored advertisements for other applications. For example, some applications include advertisements (e.g., via a banner add, a pop-up add, etc.) advertising one or more additional applications that the user can download and install. This type of in-application advertisement is problematic, however, in that clicking the advertisement generally prompts an "app-switch." An app-switch abruptly kicks the user out of the application including the advertisement into a website or application repository program where the user can initiate the download of the advertised application. Users often find app-switches disorienting and confusing. Furthermore, it is generally a hassle to navigate back to the original application from within which the user clicked the advertisement that prompted the app-switch.

Furthermore, the process of finding and installing applications becomes even more frustrating when a user is switching from using one mobile device to a new mobile device, and has to remember all the applications he had previously installed on his last mobile computing device. For example, users generally expect to upgrade mobile devices every few years, if not sooner. With each upgrade, the user typically has to re-install any applications that are not part of what comes installed by default on the new mobile device. In many cases, a typical user installs and uses ten, twenty, thirty, or sometimes even more applications. This means the user has to remember, search, download, and install each additional application one-by-one. The process to install all the applications the user installed on the user's previous mobile device can thus be time consuming and frustrating to the user.

Thus, there are several disadvantages to current methods for recommending, downloading, and installing applications on mobile devices.

SUMMARY

One or more embodiments described herein provide benefits and/or solve one or more of the foregoing or other problems in the art with systems and methods for providing application recommendations to a user of a mobile device. One or more embodiments described herein provide application recommendations to a user of a mobile device based on social networking information associated with the user. For example, the systems and methods described herein use social networking information to provide personalized application recommendations to a user of a mobile device using one or more points of user contact via a mobile device. In one or more embodiments, for example, the systems and methods provide personalized application recommendations to a mobile device user during an initial configuration of a mobile device, within a dedicated application on a user device that provides the mobile device access to an application repository, or within in-application advertisements within an undedicated application on the mobile device.

For instance, one or more embodiments provide systems and methods that identify a user identifier during an initial configuration of a mobile device. Based on the user identification, the systems and methods can access and/or analyze social networking information associated with the user identifier to determine on or more applications to recommend to the user during the initial configuration of the mobile device. Accordingly, examples of the systems and methods provide relevant application recommendations to the user at a point of user contact that allows the user to efficiently identify and select applications to install on the mobile device as part of the initial configuration of the mobile device.

Moreover, one or more example embodiments provides systems and methods that include a dedicated application having access to an application repository that accesses social networking system information associated with a user of a mobile device and recommends applications via the dedicated application. For example, the systems and methods can provide an application that accesses social networking system information to recommend applications to a user based on applications used by other user's of the social networking system having one or more connections or similarities with the user of the mobile device. In one or more embodiments, the systems and methods cause the dedicated application to present various recommendations via various graphical user interface elements, as will be explained in detail below.

In addition to recommending applications during an initial configuration of a mobile device or using a dedicated application, one or more embodiments provide systems and methods to recommend an application to a user within an advertisement within an undedicated application (e.g., an application that is not dedicated to providing access to an application repository). Moreover, the systems and methods allow the user to accept the recommendation and install the application without switching from the undedicated application to complete the download and install of the application. For example, systems and methods described herein enable a user to select, download, and install an application on the user's mobile device by simply interacting with an graphical element within the advertisement and without switching away from the undedicated application in which the advertisement was served. Thus, various example embodiments include systems and methods that provide a faster and intuitive way for a user to install an application in response to reacting to in-app or online advertisement recommending the application to the user.

Additional features and advantages of the present application will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments will be described and explained with additional specificity and detail through the use of the accompanying drawings in which.

DETAILED DESCRIPTION

Figure 1:
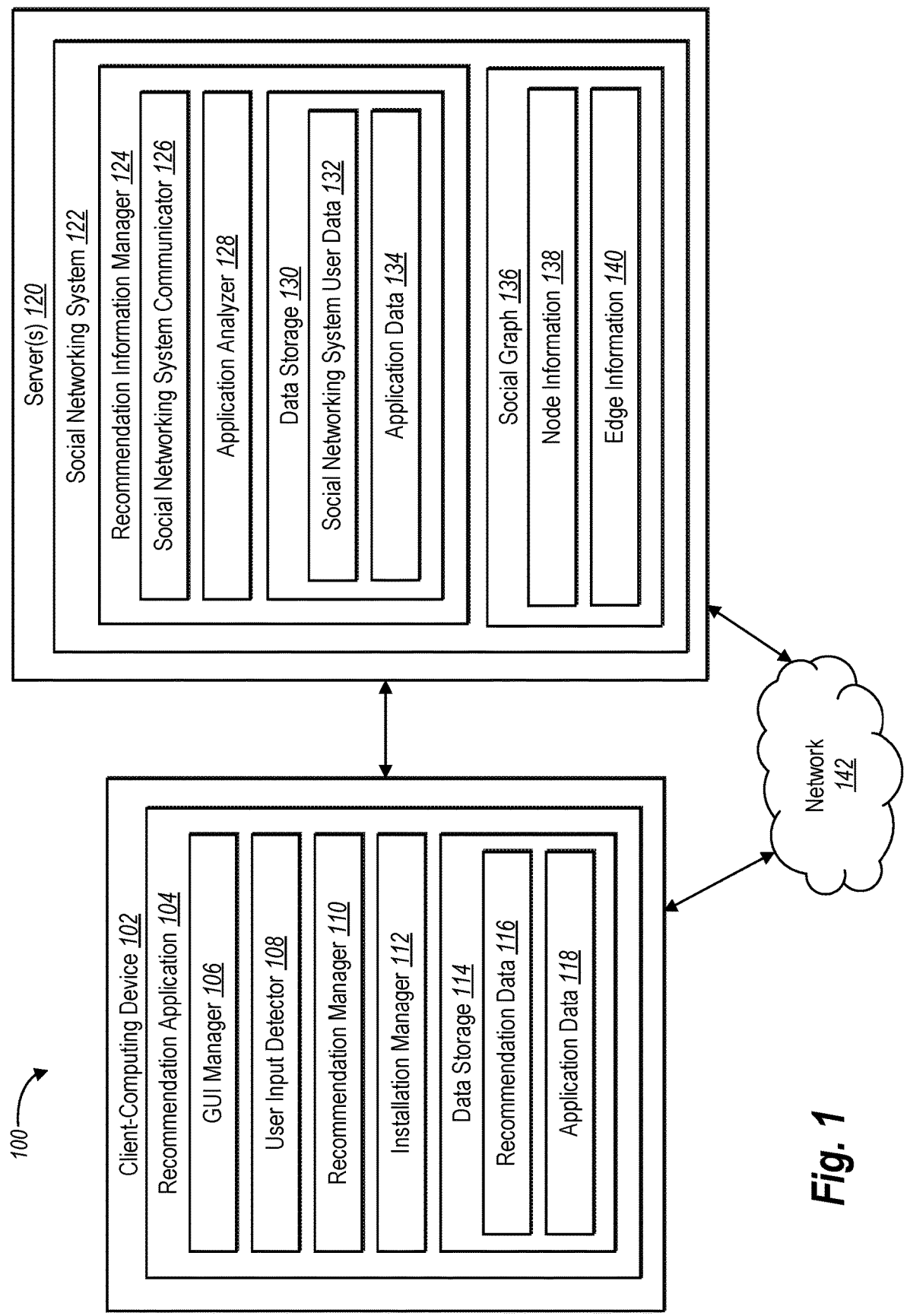
FIG. 1 illustrates a schematic diagram of a recommendation system in accordance with one or more embodiments.

One or more embodiments described herein provide benefits and/or solve one or more of the foregoing or other problems in the art with an application recommendation system ("recommendation system") for recommending, to a user, applications based on social networking information. For example, the recommendation system provides application recommendations to a user based on social networking system information associated with the user. Depending on a particular embodiment, the recommendation system can provide application recommendations to a user at a variety of contact points with a user of a mobile device. For instance, in one or more embodiments, the recommendation system provides application recommendations during an initial configuration of a mobile device, via a dedicated recommendation application installed on the mobile device, or via advertisements served within undedicated applications (e.g., an application that is not dedicated to providing access to an application repository).

Notwithstanding the various contact points that the recommendation systems uses to recommend applications to a user, one or more embodiments of the recommendation system further provide streamlined and efficient processes that allows a user to easily download and install a recommended application on a mobile device. For instance, example embodiments of the recommendation system enables users to select, download, and install applications on a mobile device without an app-switch (e.g., switching between an undedicated application that provides the recommendation, and a dedicated application for downloading and installing applications). Accordingly, the recommendation system can provide a user experience and graphical user interface that allows a user to intuitively and easily accept a recommendation to download and install an application on the user's mobile device.

As an overview of an example contact point for recommending applications to a user, and as mentioned above, the recommendation system provides application recommendations during an initial configuration of a mobile device. As used herein, the term "initial configuration" refers to a setup process of a mobile device to allow a user to commence using the mobile device. In particular, an initial configuration can include changing factory default settings to customized settings that configure a mobile device for use by a particular user. In one or more embodiments, an initial configuration can refer to the process of setting up a new device received direct from the device manufacturer. In other instances, an initial configuration can include the processing of reformatting a device that was already in use.

To provide application recommendations during an initial configuration of a mobile device, in one or more embodiments, the recommendation system can include various components in a factory default configuration (e.g., factory default settings) associated with a mobile device. Upon a user of the mobile device initiating an initial configuration of the mobile device, the recommendation system can provide personalized application recommendations to the user as part of the initial configuration process for the mobile device. Thus, recommendation system allows the user to avoid the time and hassle of searching for and installing various applications on a one-by-one basis.

More particularly, in one or more embodiments, the recommendation system provides personalized application recommendations during the initial configuration process by identifying the user of the mobile device (e.g., based on an identifier associated with the user, such as a phone number, email address or other identifier) and identifying social networking system information associated with that user. For example, in at least one embodiment, the recommendation system analyzes social networking system information associated with the user to determine particular applications that will likely appeal to the user. The recommendation system can make this determination based on social networking system information associated with the user including, but not limited to, the user's interests, the interests of the user's social networking friends, pages, posts, and content liked or shared by the user via the social networking system, applications previously downloaded by the user, geographic location of the user, and so forth.

In addition to recommending applications during the initial configuration of a mobile device, in one or more embodiments, the recommendation system provides application recommendations using a dedicated application. As used herein, the term "dedicated application" refers to an application installed on a client-device that has the primary function of accessing a repository or library of applications for purposes of allowing a user to search, download, and install applications on the client-device. For example, in one embodiment, the recommendation system provides a dedicated recommendation application as part of the standard group of applications installed on the mobile device. In response to the user utilizing the dedicated recommendation application to search for applications, the recommendation system provides personalized application recommendations to the user via the dedicated application by analyzing social networking system information associated with the user, as described above.

Furthermore, in one or more additional embodiments, the recommendation system provides application recommendation to a user of a mobile device within an undedicated application. As used herein, the term "undedicated application" refers to an application installed on a client-device that has a primary function that is different from accessing a repository or library of applications for purposes of allowing a user to search, download, and install applications on the client-device. Examples of an undedicated application can include social networking applications, web browser applications, mobile game applications, instant messenger applications, and any other application that has a primary purpose or function that is not directly associated with searching and installing applications.

As briefly mentioned above, the recommendation system can provide application recommendations within an undedicated application in the form of in-app or online recommendations that prompt a user to download and install a recommended application. Different from conventional systems, however, when a user selects a recommended application for installation from within an undedicated application, the recommendation system provides the user with a download and installation user experience directly within the undedicated application and without changing a presentation focus of a graphical user interface of the undedicated application. In other words, the recommendation system enables the user to download and install applications without prompting an app-switch. For example, in response to a user selecting an option to install a recommended application, the recommendation system provides download and installation information either within the undedicated application or superimposed over the undedicated application. Thus, even during the download and installation of the game application, the presentation focus of the undedicated application does not change, which in turn provides an intuitive and efficient installation user experience.

As used herein, the term "social networking system" refers to a system that supports and enables on-line communication, input, interaction, content-sharing, and collaboration between users (e.g., people, business, or other entities). A user of the social networking system can have one or more "friends" within the social networking system. As used herein, the term "friend" refers to a co-user associated with a user via the social networking system (i.e., a contact or connection). A "social networking system application" refers to an application that enables a user to access and perform various functions within the social networking system.

As mentioned above, the recommendation system utilizes social networking system activity associated with a particular user in order to recommend applications to the user. As used herein, "social networking system activity" refers to at least one interaction between a social networking system user and the social networking system. For example, the social networking system provides various input controls within a social networking system application that allow the user to "check-in" at a particular place within the social networking system, comment on posts submitted by other users within the social networking system, "like" (e.g., indicate agreement with or support for) a post within the social networking system, share content with friends and other users of the social networking system, maintain a profile within the social networking system, etc. Any of these interactions, either alone or in combination, qualify as a social networking system activity.

FIG. 1 illustrates a schematic diagram illustrating an example embodiment of a recommendation system 100 (or simply "system 100"). As shown in FIG. 1, the system 100 may include various components for performing the processes and features described herein. For example, as shown in FIG. 1, the system 100 may include, but is not limited to, at least one client-computing device 102 and one or more servers 120. In one or more embodiments, the client-computing device 102 includes, but is not limited to, a recommendation application 104 including a graphical user interface ("GUI") manager 106, a user input detector 108, a recommendation manager 110, and installation manager 112, and a data storage 114 including recommendation data 116 and application data 118.

In one or more embodiments, the server(s) 120 includes, but is not limited to, a social networking system 122 including a recommendation information manager 124. As further shown in FIG. 1, the recommendation information manager 124 includes a social networking system communicator 126, an application analyzer 128, and a data storage 130 including social networking system user data 132, and application data 134. Additionally, in one or more embodiments, and as illustrated in FIG. 1, the social networking system 122 may include a social graph 136 for representing and analyzing a plurality of users, actions, and concepts. Node information 138 of the social graph 136 can store node information comprising, for example, nodes for users and nodes for repositories. Edge information 140 of the social graph 136 can store edge information comprising relationships between nodes and/or actions occurring within the social networking system 122. Further detail regarding the social networking system 122, the social graph 136, edges, and nodes is presented below with respect to FIG. 10.

The social networking system 122, and its components 124-130 can be implemented using a computing device including at least one processor executing instructions that cause the system 100 to perform the processes described herein. In some embodiments, the components 124-130 of the social networking system 122 can be implemented by a single server device 120, or across multiple server devices. Additionally or alternatively, a combination of one or more server devices and one or more client devices can implement the components of the social networking system 122 and/or the client-computing device 102. Furthermore, in one embodiment, the components 104-114 and 122-130 can comprise hardware, such as a special-purpose processing device to perform a certain function. Additionally or alternatively, the components 104-114 and 122-130 can comprise a combination of computer-executable instructions and hardware.

The client-computing device 102 may include any one of various types of computing devices. For example, the client-computing device 102 can include a mobile device such as a mobile telephone, a smartphone, a personal digital assistant, a tablet, a laptop, a smart wearable, or a non-mobile device such as a desktop, a server, and/or another type of computing device. Additional details with respect to the client-computing device are discussed below with respect to FIG. 9.

In one or more embodiments, the recommendation application 104 can be a native application installed on the client-computing device 102. For example, the recommendation application 104 may be a mobile application that installs and runs on a mobile device, such as a smart phone, a tablet, etc. Alternatively, the recommendation application 104 can be a desktop application, widget, or other form of a native computer program. Alternatively, the recommendation application 104 may be a remote application accessed by the client-computing device 102. For example, the recommendation application 104 may be a web application that is executed within a web browser of the client-computing device 102.

As mentioned above, and as shown in FIG. 1, the recommendation application 104 includes a GUI manager 106. The GUI manager 106 provides, manages, and/or controls a graphical user interface (or simply "user interface") that enables a user to view application recommendations, and installation information. In one or more embodiments, the GUI manager 106 is operable during the initial setup of the client-computing device 102, or at any point thereafter.

More specifically, the GUI manager 106 can facilitate the display of a user interface (e.g., by way of a display device associated with the client-computing device 102). For example, the GUI manager 106 may compose a user interface using a plurality of graphical components, objects, and/or elements that allow a user to view, select, download, install, and interact with applications recommended by the system 100. More particularly, the GUI manager 106 may direct the client-computing device 102 to display a group of graphical components, objects, and/or elements that enable a user to view, select, download, install, and interact with applications recommended by the recommendation system 100.

As further illustrated in FIG. 1, the recommendation application 104 includes a user input detector 108. In one or more embodiments, the user input detector 108 detects, receives, and/or facilitates user input in any suitable manner. In some examples, the user input detector 108 detects one or more user interactions with respect to a graphical user interface. As referred to herein, a "user interaction" means a single interaction, or combination of interactions, received from a user by way of one or more input devices. For example, the user input detector 108 detects a user interaction from a keyboard, mouse, touch pad, touch screen, and/or any other input device. In the event the client-computing device 102 includes a touch screen, the user input detector 108 detects one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 108 may additionally, or alternatively, receive data representative of a user interaction. For example, the user input detector 108 may receive one or more user configurable parameters from a user, one or more user commands from the user, and/or any other suitable user input. The user input detector 108 may receive input data from one or more components of the social networking system 122, or from one or more remote locations.

Also as illustrated in FIG. 1, the recommendation application 104 includes the recommendation manager 110. In one or more embodiments, the recommendation manager 110 utilizes information specific to a user of the client-computing device 102 to generate one or more application recommendations personalized to the user. In one or more embodiments, the recommendation manager 110 communicates with the social networking system 122 to obtain social networking system information particular to a user of the client-computing device 102.

For example, the recommendation manager 110 can send a user identifier specific to a user of the client-computing device 102 to the social networking system 122 (e.g., the user's phone number, email address, or the user's social networking system ID). In at least one embodiment, the recommendation manager 110 identifies a user identifier from input provided by the user of the client-computing device 102 via a graphical user interface or from information specific to the client-computing device 102 (e.g., a phone number). Based on receiving a user identifier, the social networking system 122 can identify social networking information within the social networking system that corresponds specifically to the user of the client-computing device 102 including, but not limited to, the user's profile information, information related to the user's comments, information related to the user's "likes," information related to the user's shares, information related to the user's social networking system friends, information related to other applications the user has installed or commented on via the social networking system, and so forth.

In some embodiments, the social networking system 122 matches a unique social networking system identifier to the user of the client-computing device 102 based on information provided by recommendation manager 110. For example, in one or more embodiments, the social networking system 122 assigns the user a unique social networking system identifier and stores the user's information including, a phone number, demographic information (e.g., age, gender, relationship status, etc.), and so forth in association with the assigned identifier. The social networking system 122 can assign unique user identifiers to each social networking system user. In at least one embodiment, the social networking system 122 organizes this user information and the corresponding unique social networking system identifier within a corresponding node in the social graph 136. Thus, in response to receiving a phone number, a user name, etc., from the client-computing device 102 and via the recommendation manager 110, the social networking system 122 can identify the unique social networking system identifier for the user of the client-computing device 102. In one or more embodiments, once the social networking system 122 has identified the unique social networking system identifier for the user of the client-computing device 102, the social networking system 122 can identify additional information associated with the user of the client-computing device 102 (e.g., the user's friends, the user's likes, the user's comments, the user's application use and downloads, and so forth).

Additionally, the recommendation manager 110 communicates with the social networking system 122 to receive information about applications that are available for downloading and installing in order to provide personalized application recommendations for the user of the client-computing device 102. For example, in one or more embodiments and as will be described in more detail below, the social networking system 122 performs an analysis of applications, using social networking information, that are available for downloading and installing on mobile devices in order to identify audiences of users who would likely download and install particular applications. As such, in response to the recommendation manager 110 communicating various key pieces of information associated with the user of the client-computing device 102 (e.g., a user identifier or user demographic information provided by the user via one or more graphical user interfaces as further described below with regard to FIG. 2C) to the social networking system 122, the social networking system 122 can determine one or more applications in which the user of the client-computing device 102 may be interested.

For example, in response to determining from the user's social networking system information that the user is an enthusiastic video game player (e.g., the user has liked video game social networking system pages, has commented on friends status updates related to video games, has previously downloaded and installed video game applications, etc.), the social networking system 122 may identify a video game application that is popular with other social networking system users to recommend to the user of the client-computing device 102. Therefore, upon determining one or more applications in which a user may have interest, the social networking system 122 can provide the recommendation manager 110 with a listing of the one or more applications for recommendation to the user. In one or more embodiments, the social networking system 122 can determine one or more applications in which a user may have interest by directly comparing user information to application information (e.g., the user likes video games and the application is a video game). In additional embodiments, the social networking system 122 can determine one or more applications in which a user may have interest calculating a score for the user (e.g., based on the user's interests, demographic information, etc.) and ranking possible recommended applications based on the user's calculated score.

In addition to the listing of one or more recommended applications, the social network system 122 can also provide application information corresponding to each of the one or more recommended applications. For example, the application information can include, but is not limited to, target audience demographic information associated with a particular application, subject matter associated with the particular application, social networking system information associated with other social networking system users who have downloaded and installed the particular application, and so forth. Thus, the recommendation manager 110 can provide the user of the client-computing device with relevant information on the application recommendations (e.g., the number of friends that use a particular application, or how the application type matches known demographic information about the user). In an alternative embodiment, rather than provide a listing of applications that correspond to the user's demographic information, the social networking system 122 may simply provide the recommendation manager 110 with a listing of all applications currently available along with information associated with each available application.

In response to receiving the listing of one or more application recommendations and application information from the social networking system 122, the recommendation manager 110 generates, for presentation to the user one the client-computing device 102, a recommendation of one or more applications. In this manner, the recommendation manager 110 generates one or more application recommendations based on the user's likes, interests, hobbies, areas of focus, and needs. The recommendation manager 110 can generate recommendations during an initial setup of the client-computing device 102, using a dedicated application, or within an undedicated application, as will be explained further below.

As illustrated in FIG. 1, and as mentioned above, the recommendation application 104 also includes an installation manager 112. In one or more embodiments, the installation manager 112 manages the events and procedures associated with downloading and installing an application on the client-computing device 102. For example, the installation manager 112 recognizes an installation request initiated by a user of the client-computing device 102. In at least one embodiment, the installation manager 112 recognizes an installation request initiated by the user when the user selects an application for installation during an initial setup of the client-computing device 102 (e.g., during an initial configuration of factory default settings). Additionally or alternatively, the installation manager 112 recognizes an installation request initiated by the user within a dedicated application recommendation program or within a suggestion or advertisement in an undedicated application.

In one or more embodiments, the installation manager 112 recognizes application installation requests in various ways. For example, the installation manager 112 recognizes various display interactions between the user of the client-computing device 102 and one or more displays on the client-computing device 102. To illustrate, the installation manager 112 recognizes a user selecting a button or other graphical element using a touch gesture (e.g., a tap, double-tap, etc.), or other type of selection using a mouse input or keyboard. In at least one embodiment, the installation manager 112 can recognize eye gesture selections of a recommended application (e.g., via a camera associated with the client-computing device 102).

As described above, the system 100 enables a user to download and install a selected application onto the client-computing device 102 while maintaining a presentation focus (e.g., without prompting an app-switch). For example, in response to a user of the client-computing device 102 selecting a recommended application for download and installation within an undedicated application, the installation manager 112 can manage the download and installation process without causing an app-switch, as well as provide updates about the download and installation process to the user without an app-switch. In other words, the installation manager 112 manages the download and installation process by communicating with an underlying operating system to handle every process necessary to download and install a selected application. In one or more embodiments, all communications between the operating system and the installation manager 112 is in the background such that the user is not aware of the minutiae of any download or installation tasks.

To illustrate, rather than prompting an app-switch to a separate dedicated application for downloading and installing applications, the installation manager 112 configures and provides various interfaces and/or controls related to the download and installation within the undedicated application. In one or more embodiments, the installation manager 112 either embeds or super-imposes the various interfaces or controls over the display from which the user initiated the download and installation. Thus, the user of the client-computing device 102 does not need to navigate back to a previous application once the download and installation of a recommended application is complete.

Additionally, and as illustrated in FIG. 1, the recommendation application 104 includes data storage 114. As shown, the data storage 114 includes recommendation data 116 and application data 118. In one or more embodiments, the recommendation data 116 can include data representative of recommendation information, such as described herein (e.g., social networking system information specific to a user of the client-computing device 102 used to generate one or more application recommendations, etc.). Similarly, in one or more embodiments, the application data 118 can include data representative of application information, such as described herein (e.g., applications that have been recommended to the user of the client-computing device 102 previously, etc.).

As illustrated in FIG. 1, the system 100 includes the social networking system 122 hosted by one or more server(s) 120. The social networking system 122 provides social networking system posts (whether text or otherwise) to a graphical user interface (e.g., a profile, a newsfeed, or "wall") of one or more users of the social networking system 122 and enables social networking system users to engage in other types of social networking activities (e.g., likes, comments, shares, etc.). Additionally, the social networking system 122 can track user information (e.g., demographic information, comments and likes, information related to friends associated with the user, and so forth) and user interactions (e.g., links clicked by the user via the social networking system 122, applications downloaded and installed by the user via the social networking system 122, and so forth). Accordingly, the social networking system 122 provides application recommendations to a user of the social networking system 122 based on social networking information associated with a particular user.

As mentioned above, and as illustrated in FIG. 1, the social networking system 122 further includes the recommendation information manager 124. In one or more embodiments, the recommendation information manager 124 collects, analyzes, and provides all the information necessary for the system 100 to generate application recommendations for the user of the client-computing device 102. For example, the recommendation information manager 124 collects information specific to the user of the client-computing device 102 from the social networking system 122 (e.g., the social graph 136) and analyzes available application information in order to provide a list of one or more application recommendations to the client-computing device 102.

In one or more embodiments, the recommendation information manager 124 can generate an user audience for an application. For example, the recommendation information manager 124 can access social networking information associated with various applications to identify one or more connections or correlations between users of the social networking system and each of the various applications. Moreover, the recommendation information manager 124 can analyze the connections or correlations to generate an audience network, e.g., characteristics of users (or alternatively, user identities) that are likely to be interested with a particular application. Accordingly, the recommendation information manager 124 can use the audience network to determine whether the user of the client-computing device 102 should receive a recommendation for a particular application.

As shown in FIG. 1, the recommendation information manager 124 includes the social networking system communicator 126. In one or more embodiments, the social networking system communicator 126 communicates with the social networking system 122 to collect information specific to a particular social networking system user. For example, in at least one embodiment, the recommendation application 104 provides a user identifier (e.g., a mobile phone number, a social networking system screen name or identifier, or email address) to the social networking system communicator 126. In return, the social networking system communicator 126 will identify or access information from the social networking system 122 corresponding to the user identifier. The social networking system communicator 126 may collect information from the social networking system 122 by generating and executing a set of search queries based on the provided user identifier, by accessing data repositories associated with the social networking system 122, by analyzing the social graph, or by accessing or analyzing other data available within the social networking system 122.

Once the social networking system communicator 126 has identified relevant information associated with a particular user, the social networking system communicator 126 can organize or curate the user information. For example, in at least one embodiment, the social networking system communicator 126 organizes the collected information based on whether the information is specific to the user (e.g., demographic information) or whether the information is specific to the user's actions (e.g., links clicked by the user via the social networking system 122). In additional or alternative embodiments, the social networking system communicator 126 can organize the collected information in any way to assist in identifying one or more applications to recommend to the user of the client-computing device.

As mentioned above, and as illustrated in FIG. 1, the recommendation information manager 124 further includes an application analyzer 128. In one or more embodiments, the application analyzer 128 analyzes information related to applications available for download and installation. For example, the application analyzer 128 analyzes information such as an application's target audience and/or demographic, an application's popularity within the social networking system's 122 user base, an application's download rate via the social networking system 122, an application's advertisement rate via the social networking system 122 (e.g., how often the social networking system 122 displays an advertisement related to the application, and so forth). The application analyzer 128 provides application analysis information in a table, database, linked list, data file, or in any other computer-readable format.

In addition, the application analyzer 128 uses information resulting form the analysis of available applications for download and installation, along with user information corresponding to the user of the client-computer device 102 to identify one or more applications to recommend to the user of the client computer device 102. For example, based on one or more demographics of the user, the application analyzer 128 can identify one or more applications determined to be of interest to users having the one or more demographics. As another example, the application analyzer 128 can identify one or more applications that friends of the client-computer device user have installed and used.

In one or more embodiments, the application analyzer 128 uses a scoring method to rank applications to recommend to a user based on weighted factors that correspond with identified applications. For example, the fact that a user's friends have downloaded a first application may have a larger weight, and thus the application analyzer 128 ranks the first application as more important for recommendation to the user, compared to the fact that other users that share a geographic location with a user have downloaded a second application. The weighted scores can be cumulative per application, or in other words, the application analyzer 128 can determine an overall score based on the number of instances of each factor.

Furthermore, as mentioned above, and as illustrated in FIG. 1, the recommendation information manager 124 also includes data storage 130. As shown, the data storage 130 includes social networking system user data 132 and application data 134. In one or more embodiments, the social networking system user data 132 includes data representative of social networking system user information, as described herein. Similarly, in one or more embodiments, the application data 134 includes data representative of application information, as described herein.

The client-computing device 102 and the social networking system 122 can communicate via the network 142, which may include one or more networks and may use one or more communication platforms or technologies suitable for transmitting data and/or communication signals. In one or more embodiments, the network 142 includes the Internet or World Wide Web. The network 142, however, can include various other types of networks that use various communication technologies and protocols, such as a corporate intranet, a virtual private network (VPN), a local are network (LAN), a wireless local network (WLAN), a cellular network, a wide area network (WAN), a metropolitan area network (MAN), or a combination of two or more such networks. Although FIG. 1 illustrates a particular arrangement of the client-computing device 102, the server 100, and the network 142, various additional arrangements are possible. For example, the client-computing device 102 may directly communicate with the server 120, bypassing the network 142. Additional details relating to the network 142 are explained below with reference to FIG. 9.

As will be described in more detail below, the components of the recommendation system 100 as described with regard to FIG. 1 can provide, along and/or in combination with other components, one or more graphical user interfaces ("GUIs"). In particular, the components can allow a user to interact with a collection of display elements for a variety of purposes. Specifically, FIGS. 2A-5F, and the description that follows, illustrate various example embodiments of the GUIs, functionality, and features in accordance with the principles described above.

Figure 2B:
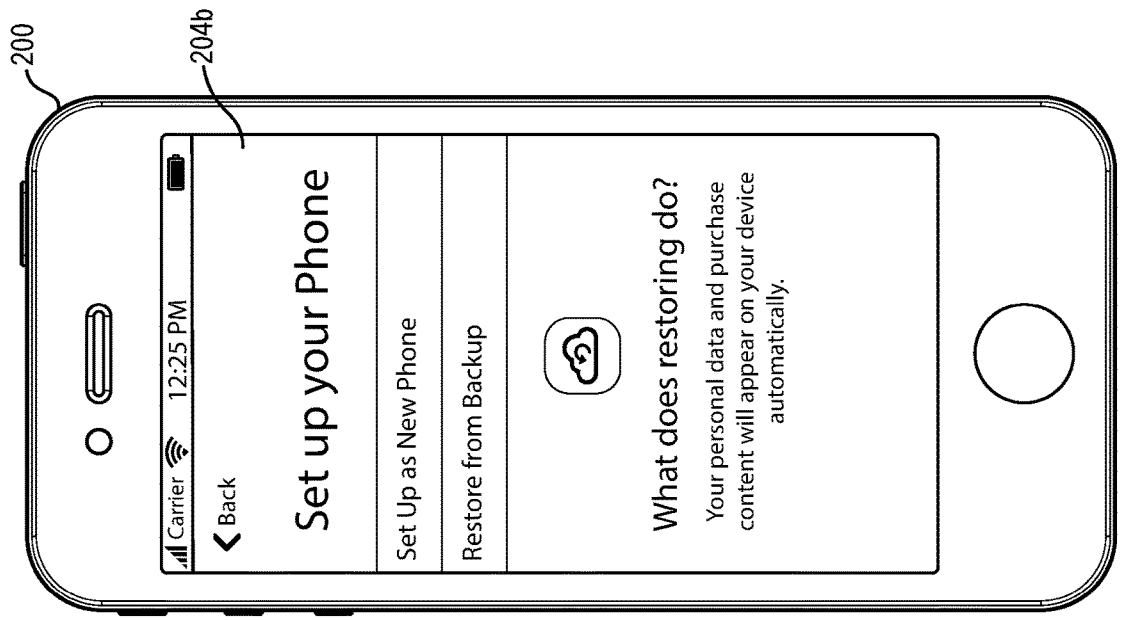
FIGS. 2A-2D illustrate an example graphical user interface for presenting a recommended application and facilitating installation of the recommended application in accordance with one or more embodiments.
Figure 2A:

By way of illustration, FIGS. 2A-5F show various views of GUIs provided at the client-computing device 102. As mentioned above, the client-computing device 102 implements and/or provides features of the recommendation system 100. For example, FIG. 2A illustrates a client-computing device 200 (e.g., the client-computing device 102) that implements one or more of the components of the recommendation system 100. As shown, the client-computing device 200 is a handheld device, such as a mobile phone (e.g., a smartphone). In additional or alternative examples, however, any other suitable computing device, such as, but not limited to, a tablet device, larger wireless device, laptop or desktop computer, a personal digital assistant device, and/or any other suitable computing device can perform one or more of the processes and/or operations described herein.

As illustrated in FIG. 2A, the client-computing device 200 includes a touch screen display 202 that can display a user interface and by way of which user input may be received and/or detected. In particular, in the illustrated embodiment, the client-computing device 200 is a touch screen device. In one or more embodiments, a touch screen device includes at least one surface upon which a user may perform touch gestures (e.g., a laptop, a tablet computer, a personal digital assistant, a media player, a mobile phone, etc.). Additionally or alternatively, the client-computing device 200 may include any other suitable input device, such as a touch pad or those described below in reference to FIGS. 8 and 9.

As mentioned above, the recommendation system 100 provides application recommendations to a user of the client-computing device 102 at various contact points during the use of the client-computing device 102. For example, the recommendation system 100 provides application recommendations during the initial configuration of the client-computing device 102. Accordingly, FIGS. 2A-2D illustrate example embodiments of the recommendation system 100 providing application recommendations and managing application installations during the initial configuration of factory default settings associated with the client-computing device 102. As shown in FIG. 2A, the touch screen display 202 of the client-computing device 200 displays an initial configuration GUI 204a. Generally, when a user first receives or purchases a client-computing device, the client-computing device includes instructions and procedures that help the user initially customize settings from the factory default settings originally provided at the manufacture of the client-computing device. For example, factory default settings associated with the client-computing device can include, but are not limited to, geographical settings, language settings, security settings, notification settings, access settings, display settings, and so forth.

In one or more embodiments, in response to a "trusted source" agreement between a service carrier associated with the client-computing device 200 and the social networking system 122, the recommendation system 100 can include additional settings for the user to configure during the initial configuration of factory default settings associated with the client-computing device 200. As used herein, a "trusted source" agreement refers to an agreement between a service carrier associated with the client-computing device 200 and the social networking system 122 wherein the service carrier enables the social networking system 122 to include embedded functionality in the client-computing device 200 in return for a percentage of revenue earned by way of that embedded functionality.

To illustrate, as shown in FIGS. 2A and 2B, the initial configuration of the client-computing device 200 can include various initial configuration GUIs, such as the initial configuration GUI 204a, as shown in FIG. 2A, and the initial configuration GUI 204b, as shown in FIG. 2B. Through these initial configuration GUIs 204a, 204b, the user of the client-computing device 200 can configure various settings. Depending on the service provider associated with the client-computing device 200, the initial configuration process can include multiple initial configuration GUIs by way of which the user of the client-computing device 200 can setup, activate, and provide settings for the client-computing device 200.

Figure 2D:
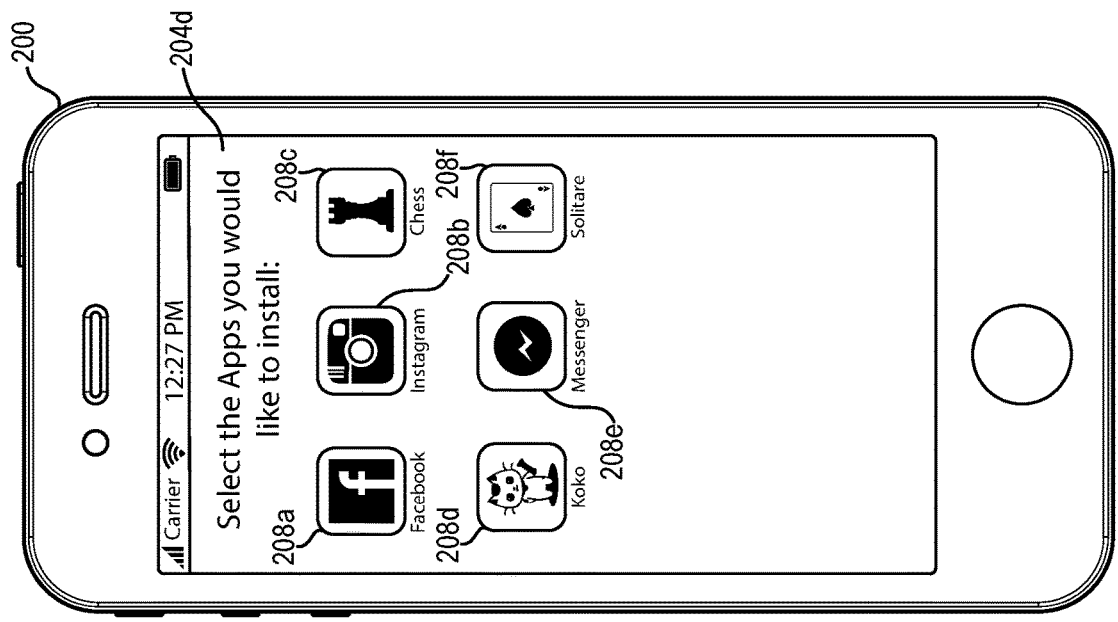
Figure 2C:
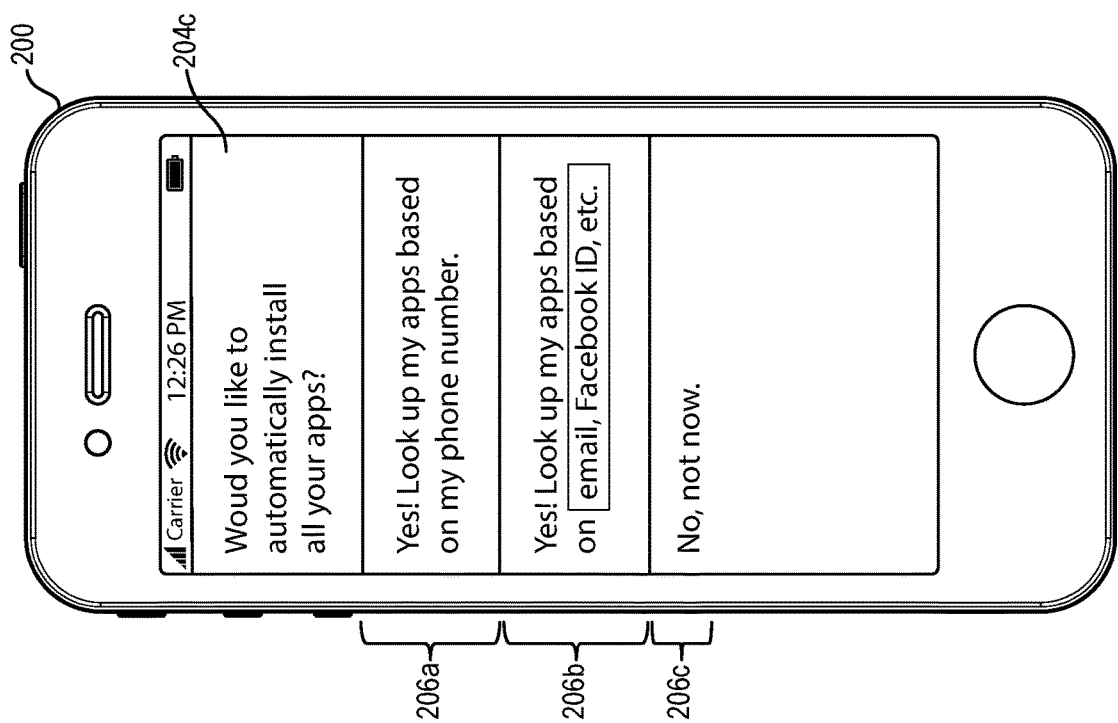

As part of the initial configuration of the client-computer device 200, and as shown in FIG. 2C, the recommendation system 100 can provide an application configuration GUI 204c on the touch screen display 202 of the client-computing device 200. As illustrated in FIG. 2A, the application configuration GUI 204c prompts the user to determine if the user wants to install applications as part of the initial configuration process (e.g., "Would you like to automatically install your apps?"). The prompt can take various forms, such as requesting the user if they would be interested in receiving application recommendations to install during the initial configuration of the client-computing device 200. Alternatively, the application configuration GUI 204c may simply ask for user identification information, and in response to receiving the user identification information, provide application recommendations.

In one or more embodiments, the application configuration GUI 204c further includes multiple configuration selection controls 206a, 206b, and 206c, as shown in FIG. 2C. For example, control 206a allows a user to provide a phone number to identify the user for purposes of identifying applications to recommend. Similarly, control 206b allows a user to provide an email, FACEBOOK ID, or other user identity that the recommendation can then use to identify applications to recommend to the user during the initial configuration of the client-computing device 200. By selecting one of the configuration selection controls 206a-206c, the user can utilize the recommendation system 100 to download and install various applications on the client-computing device 200.

As described above, the recommendation manager 110 can receive social networking system information for a particular social networking system user based on one or more types of identifiers. For example, in response to the user selecting the configuration selection control 206a, the client-computing device 200 can request and receive a phone number associated with the user, and send the phone number to the social networking system. Accordingly, the recommendation system 100 identifies social networking system information for the user of the client-computing device 200 based on the provided phone number. In one or more embodiments, the client-computing device 200 does not have to receive the phone number from the user, but rather, can determine the phone number associated with the client-computing device based on previous initial configuration steps.

Alternatively, the user can provide other identifying information, such as an email or social networking system identifier, through the configuration selection control 206b (including associated passwords for identify verification). The recommendation system 110 uses a user identifier to access social networking system information from the social networking system 122 specific to the user of the client-computing device 200. Based on accessing social networking system information associated with the user, the recommendation system 110 can identify one or more applications to recommend or to install on the client-computing device 200, as is further discussed below.

In one or more embodiments, a user may not want to install applications during the initial configuration of the client-computing device 200. In such an instance, the user can selection control 206c to deny the request to install applications. In response to the user selecting the configuration selection control 206c, the initial configuration process for the client-computing device 200 can skip the services and functionality provided by the recommendation system 100 during the initial configuration of the client-computing device 200.

In response to the user utilizing either the configuration selection control 206a or the configuration selection control 206b, the recommendation system 100 can provide the application selection GUI 204d via the client-computing device 200, as illustrated in FIG. 2D. As discussed above, based on the user identifier provided or collected in response to GUI 204c of the initial configuration process, the recommendation system 100 can identify social networking system information from the social networking system specific to the user of the client-computing device 200. The received social networking system information can include information upon which the recommendation system 100 can generate a recommendation for one or more applications that the user will likely enjoy or find useful. Additionally, the received social networking system information can include information related to applications the user has downloaded and installed on other devices in the past. Thus, the recommendation manager 110 can generate application recommendations for the user of the client-computing device 102 based on the user's social networking system activity as well as on other applications the user has downloaded and installed previously.

Once the recommendation system 100 generates application recommendations for the user of the client-computing device 102, the recommendation application 104 can provide the application selection GUI 204d including application selection controls 208a-208f. In one or more embodiments, each of the application selection controls 208a-208f corresponds with an application recommendation provided by the recommendation system 100. In response to the user selecting any of the application selection controls 208a-208f, the recommendation system 200 manages the download and installation of the application represented by the selected application selection controls. Thus, once the user of the client-computing device 200 completes the initial configuration of the client-computing device 200, the selected applications will be available for use. In at least one embodiment, in response to the user selecting any of the application selection controls 208a-208f, the recommendation manager 110 reports information associated with the corresponding applications to the social networking system 122, such that the social networking system 122 can track the user's download and installation history.

In addition to the example application selection GUI 204d shown in FIG. 2D, the recommendation system 100 can provide application recommendations in a variety of formats. For example, the recommendation system 100 can provide a group of applications identified as "previously installed" applications that the user has previously installed and used on other devices. Alternatively, the recommendation system can simply provide a single graphical element that represents an entire group of applications, for example, the group of previously installed applications. Upon the user selecting the single graphical element, the recommendation system 100 coordinates the download and installation of all the applications associated with the single graphical element. Accordingly, the user can download multiple applications during an initial configuration of the client-computing device 200 within a single interaction to the single graphical element. Alternatively, upon selecting control 206a shown in FIG. 2C, the recommendation system may automatically install all previously used applications to the client-computing device 200 without the need for the user to make any further selections. In one or more embodiments, the applications are downloaded from the social networking system 122. Additionally, or alternatively, the recommendation system 100 can employ various APIs to access and request applications for download and installation on the client-computing device 200.

In addition to using an initial configuration as a contact point to recommend applications, the recommendation system 100 also provides application recommendations to a user using a dedicated application or widget. In one or more embodiments, for example the dedicated application is installed as part of the factory default configuration of the client-computing device 200. For example, as mentioned above, typically client-computing devices generally include various default applications that are installed at the manufacturer prior to sending the client-computing device to a user. For example, based on a trusted source agreement between a service provider associated with the client-computing device 200 and the social networking system 122, the default programs can also include a program or widget associated with the recommendation system 100.

Figure 3B:
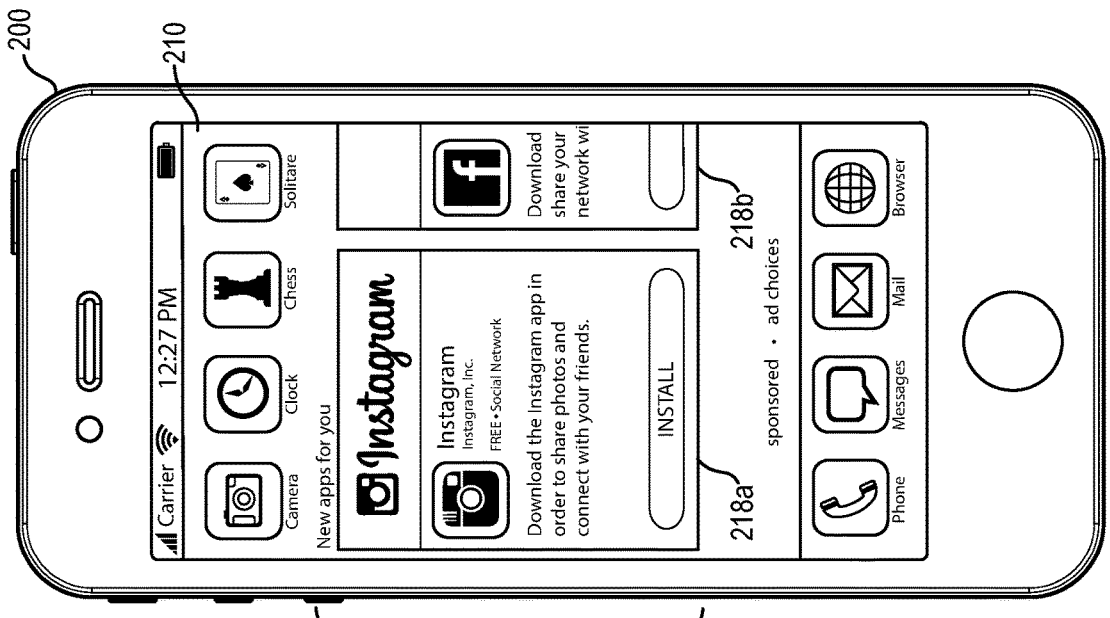
FIGS. 3A-3C illustrate another example graphical user interface for presenting a recommended application and facilitating installation of the recommended application in accordance with one or more embodiments.
Figure 3A:
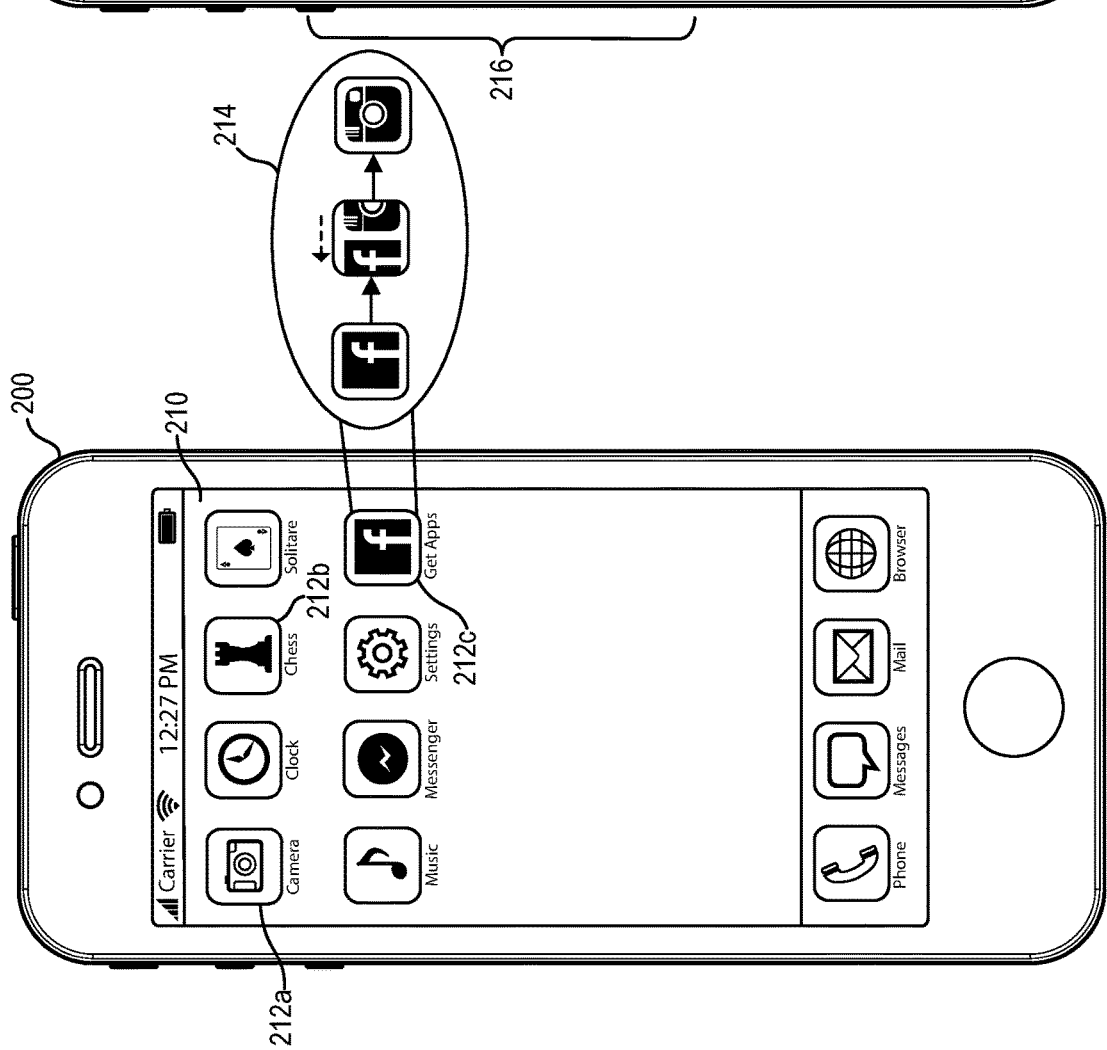

To illustrate, as shown in FIG. 3A, the operating system of the client-computing device 200 can display a home screen GUI 210. The home screen GUI 210 generally includes various application initialization controls 212a, 212b, 212c. In one or more embodiments, each application initialization control 212a-212c is associated with an application or widget that is included on the client-computing device 200 by default. In response to the user selecting an application initialization control, the operating system associated with the client-computing device 200 can initialize and open the application associated with the selected application initialization control.

As mentioned above, the recommendation system 100 can provide a dedicated application or dedicated widget within which the recommendation system 100 provides application recommendations to the user of the client-computing device 200. As illustrated in FIG. 3A, the application initialization control 212c corresponds with a dedicated program (or widget) used within the recommendation system 100. As further shown in FIG. 3A, in at least one embodiment, the application initialization control 212c presents a scrolling display, as illustrated for purposes of explanation in area 214. For example, the scrolling display scrolls through icons representing applications that the recommendation system 100 identifies based on social networking information associated with the user of the client-computing device 200. In one or more embodiments, the scrolling display serves to draw the user's attention to the application initialization control 212c to cause the user to investigate application recommendations from the recommendation system 100.

In response to the user selecting the application initialization control 212c, the recommendation system 100 provides a recommended application scroller 216, as illustrated in FIG. 3B. In one or more embodiments, the recommended application scroller 216 includes one or more recommended application controls 218a, 218b that offer the user additional information about applications recommended by the recommendation system 100. For example, as shown in FIG. 3B, each recommended application control 218a, 218b includes a title and description for each application recommended by the recommendation system 100. In at least one embodiment, the user of the client-computing device 200 can initiate the download and installation of a particular application by interacting with one of the recommended application controls 218a, 218b (e.g., by tapping the install button). Additionally or alternatively, in response to the user selecting the recommended application control 218a, the recommendation system 100 can provide additional information related to the recommended application via the recommended application GUI 220, as shown in FIG. 3C.

Figure 3C:
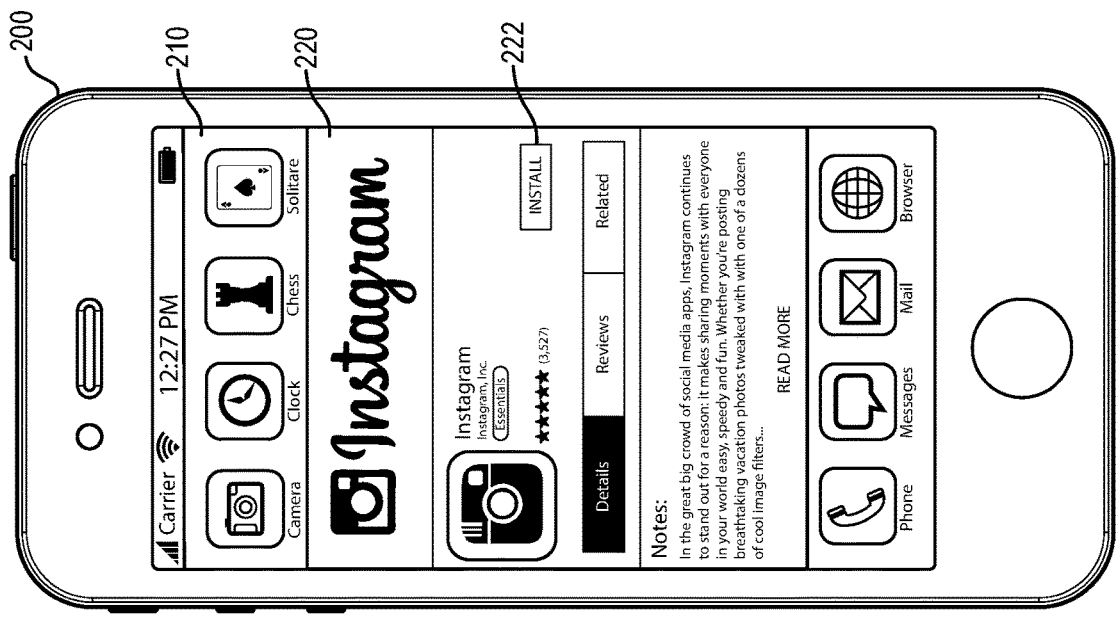

As illustrated in both FIGS. 3B and 3C, the recommendation system 100 provides both the recommended application scroller 216 and the recommended application GUI 220 super-imposed over the home screen GUI 210 of the client-computing device 200. In additional or alternative embodiments, the recommendation system 100 can provide the recommended application scroller 216 and/or the recommended application GUI 220 such that they fill the display area of the touch screen display 202. The user can initiate the download and installation of a particular application by selecting the install control 222, as shown in FIG. 3C.

In at least one embodiment, the recommendation system 100 can track applications recommended to a particular user to make sure that the recommendation system 100 provides different recommendations for each instance that the user accesses the dedicated application. In one or more embodiments, for example, the recommendation system can store data associated with applications previously recommended to a user. Thus, each time the user accesses the dedicated application the recommendation system 100 can provide new application recommendations. Additionally, the dedicated application can provide a link or section of a GUI for previously recommended applications, as well as currently recommended applications. As such, a user can access previously recommended applications at a later time, but at the same time, the recommendation system 100 also provides fresh recommendations to the user.

In addition to providing application recommendations using a dedicated application (e.g., FIGS. 3A-3C), the recommendation system 100 also provides application recommendations using undedicated applications. For example, as illustrated in FIGS. 4A-4D, the recommendation system 100 provides application recommendations via a social networking system application (e.g., FACEBOOK) installed on the client-computing device 200. Although FIGS. 4A-4D illustrate the recommendation system 100 providing application recommendations using a social networking system application, in additional embodiments, the recommendation system 100 can provide application recommendations within any other type of undedicated application or program.

Figure 4A:
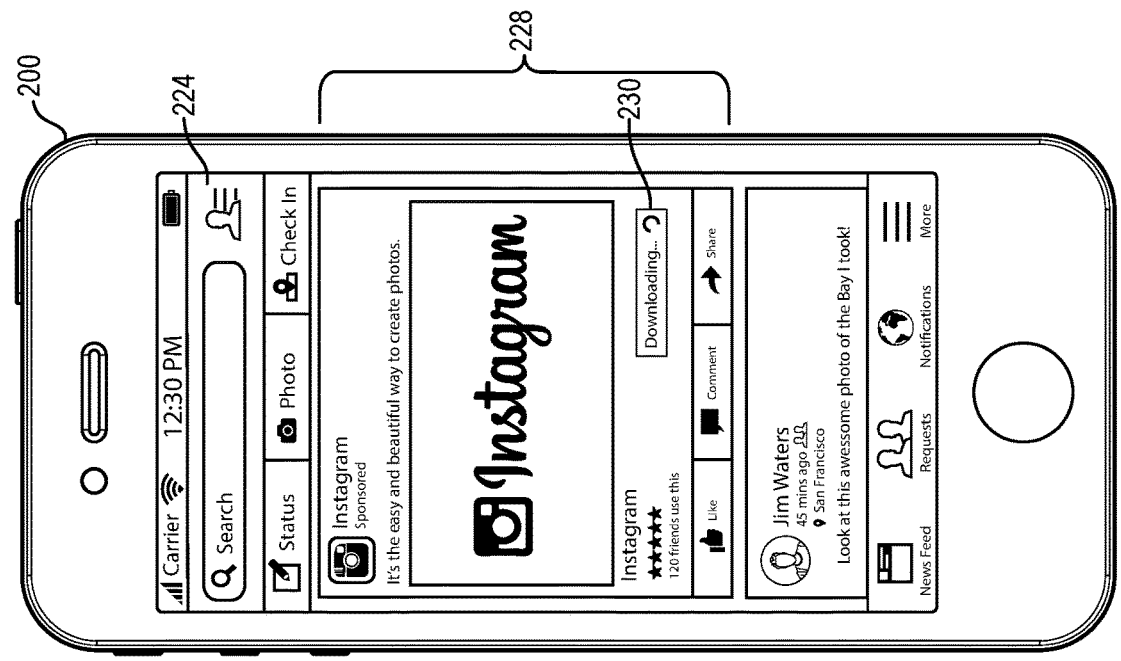
FIGS. 4A-4D illustrate yet another example graphical user interface for presenting a recommended application and facilitating installation of the recommended application in accordance with one or more embodiments.

As shown in FIG. 4A, the social networking system application provides a social networking system GUI 224 that includes a newsfeed 226. In one or more embodiments, the newsfeed 226 includes posts, updates, and so forth submitted to the social networking system 122 by social networking system user associated with the user of the client-computing device 200. Thus, by scrolling through the newsfeed 226, the user of the client-computing device 200 can view information submitted to the social networking system 122 by the user's social networking system "friends."

In at least one embodiment, the recommendation system 100 provides application recommendations for the social networking system 122 to provide to the user within the social networking application. For instance, the recommendation system 100 can cause the social networking application to provide recommended applications within the user's newsfeed 226. For example, as shown in FIG. 4A, the social networking system 122 can provide an application recommendation 228 within the user's newsfeed 226. In one or more embodiments, the application recommendation 228 includes information associated with a recommended application as well as an installation control 230.

Moreover, the application recommendation 228 can include social networking information that corresponds to the user of the client-computing device 200. For example, and as shown in FIG. 4A, the recommendation system 100 can cause the application recommendation 228 to include the number of the user's friends that have also downloaded the recommended application. Other social networking information may be identified and presented in the application recommendation 228, for example: names of friends having downloaded the application (e.g., Ted installed application A); an identified connection between a currently installed application and the recommended application (e.g., users that install application A often also install application B); a connection between geographic location an the recommended application (e.g., 56% of users within San Francisco installed application A); a connection between a user and a business (e.g., You follow Bussiness A, which offers application A); based on a user's interests (e.g., You like baseball? Try application A). The recommendation system can present various other types of social networking information, or combinations of social networking data, along with the application recommendation 228.

Figure 4B:
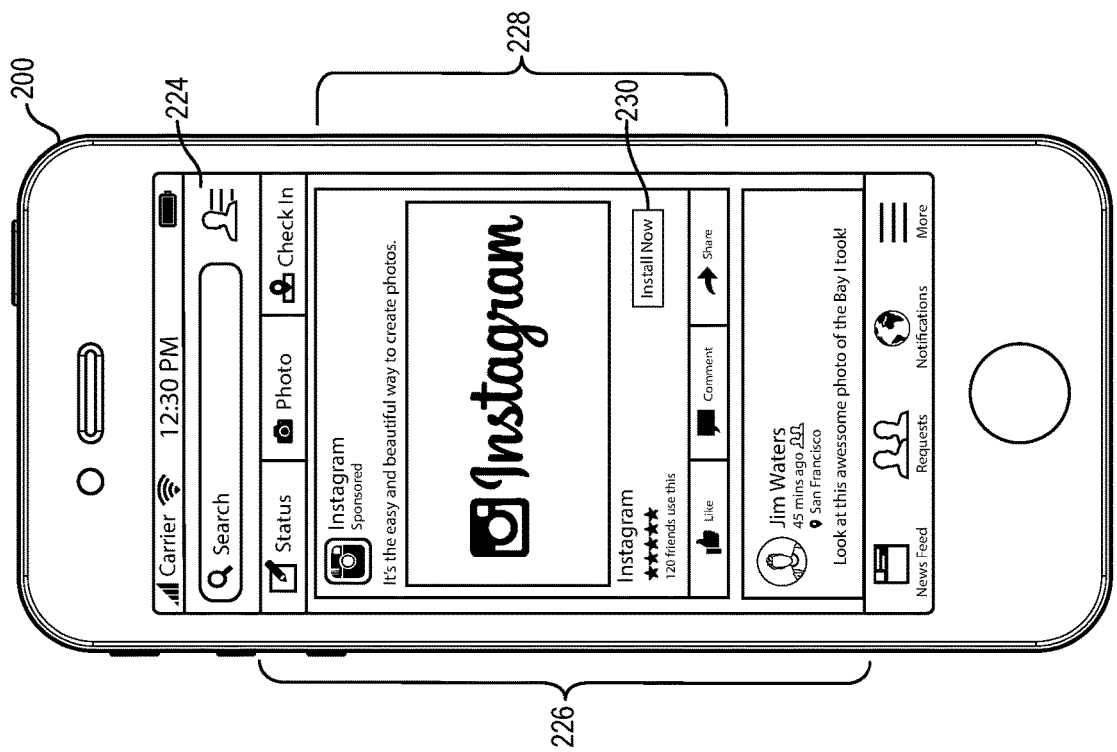
Figure 4D:
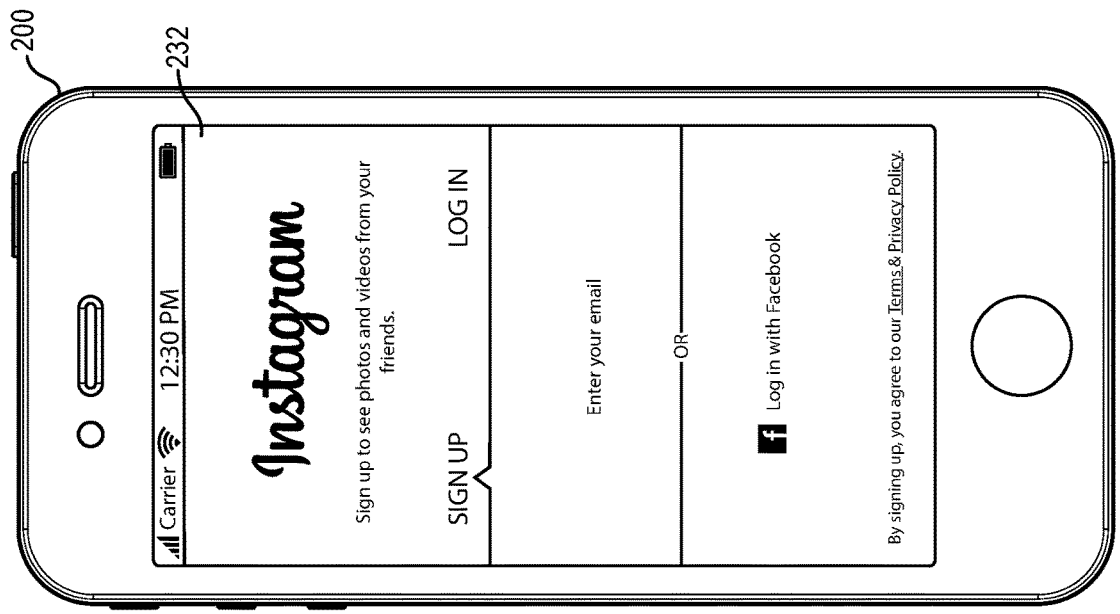
Figure 4C:
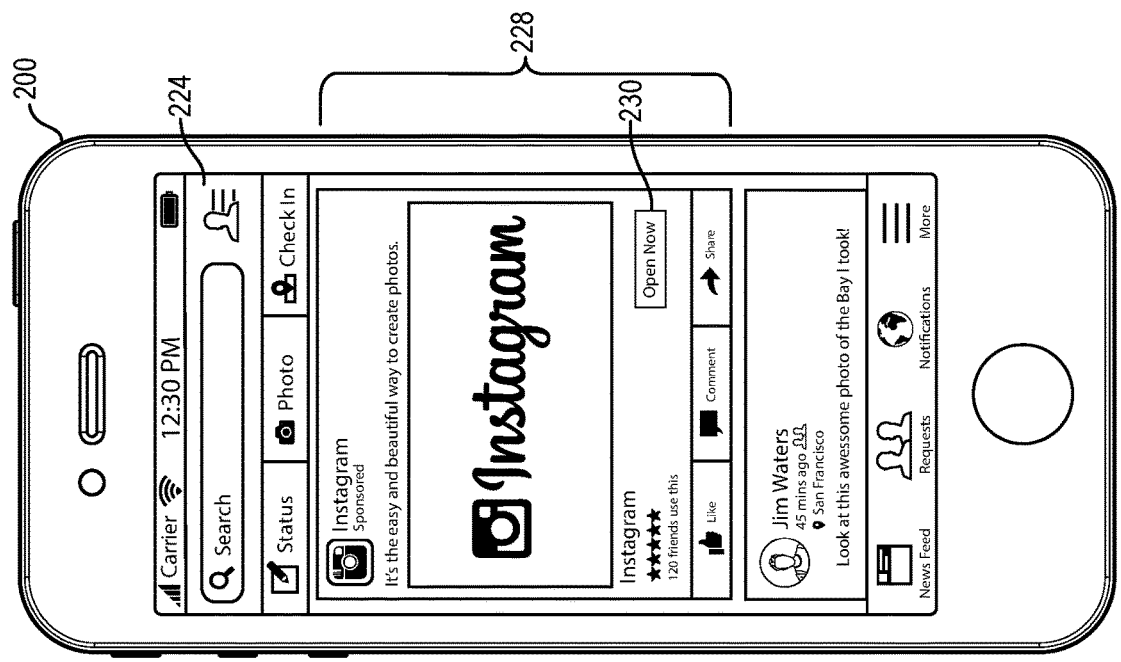

Unlike conventional systems, the recommendation system 100 provides application recommendations within an undedicated application, and in addition, the recommendation system allows for the download and installation of the application without switching from the undedicated application to a dedicated application. In particular, in response to the user of the client-computing device 200 selecting the installation control 230, the recommendation system 100 manages the download and installation of the application associated with the application recommendation 228 while the social networking application GUI 224 continues to have presentation focus. For example, as illustrated in FIGS. 4A, 4B, and 4C, the recommendation system 100 can provide updates in the download and installation process associated with the application shown in the application recommendation 228 via the installation control 230. In one or more embodiments, in response to the user selecting the installation control 230, the recommendation system 100 updates the installation control 230 to indicate that the associated application is "downloading," as shown in FIG. 4B. Once the installation files associated with application are downloaded, the recommendation system 100 can update the installation control 230 to indicate the associated application is "installing."

During the download and installation process, the user can continue to use the undedicated application. For example, in FIG. 4B, the user can continue to browse or scroll through the user's newsfeed while the recommended application is downloading or installing. In one or more embodiments, upon the user scrolling away from the recommended application 228 during the installation process, the installation control 230 is docked in a defined location within the GUI 224 to allow the user to continue to monitor the progress of the download and installation process as the user continues to view the user's newsfeed. In this way, the recommendation system provides an intuitive and seamless process from application recommendation to application installation and launch, as described with reference to FIG. 4C.

In particular, and as shown in FIG. 4C, once the recommendation system 100 has downloaded and installed the application associated with the application recommendation 228 the recommendation system 100 can again update the installation control 230 to "open now." In one or more embodiments, in response to the user selecting the installation control 230, as shown in FIG. 4C, the recommendation system 100 can prompt a requested app-switch (e.g., an app-switch that the user of the client-computing device 200 specifically requested) that switches from the social networking application to the newly installed recommended application. Thus, in response to the user selecting the installation control 230, as shown in FIG. 4C, the recommendation system 100 can enable the client-computing device to display the installed application GUI 232, as shown in FIG. 4D.

Figure 5B:
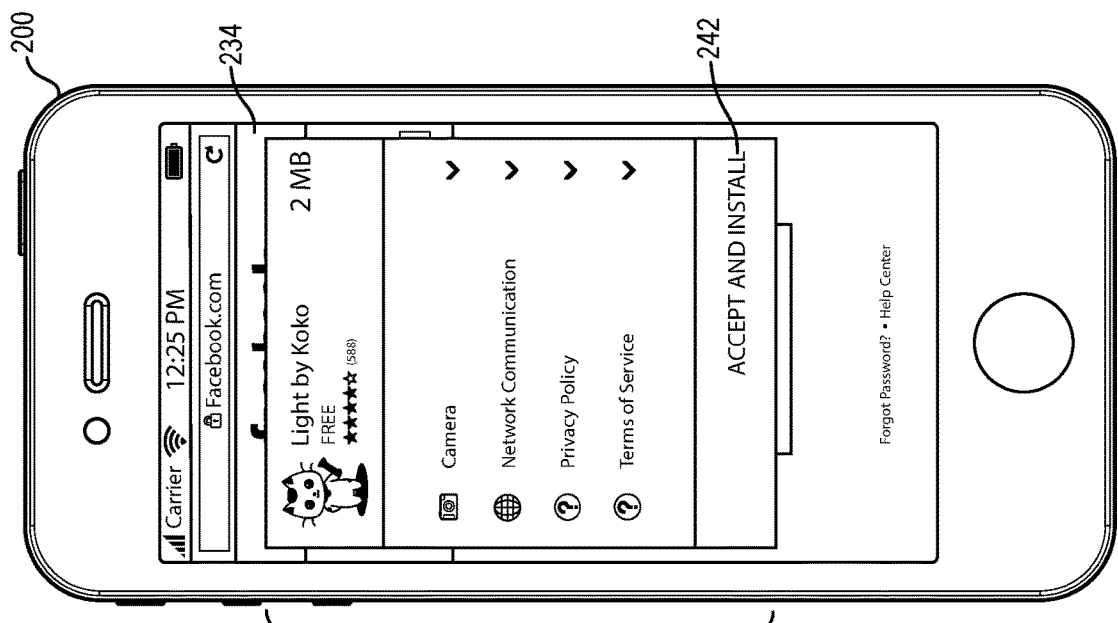
FIGS. 5A-5F illustrate another example graphical user interface for presenting a recommended application and facilitating installation of the recommended application in accordance with one or more embodiments.
Figure 5A:
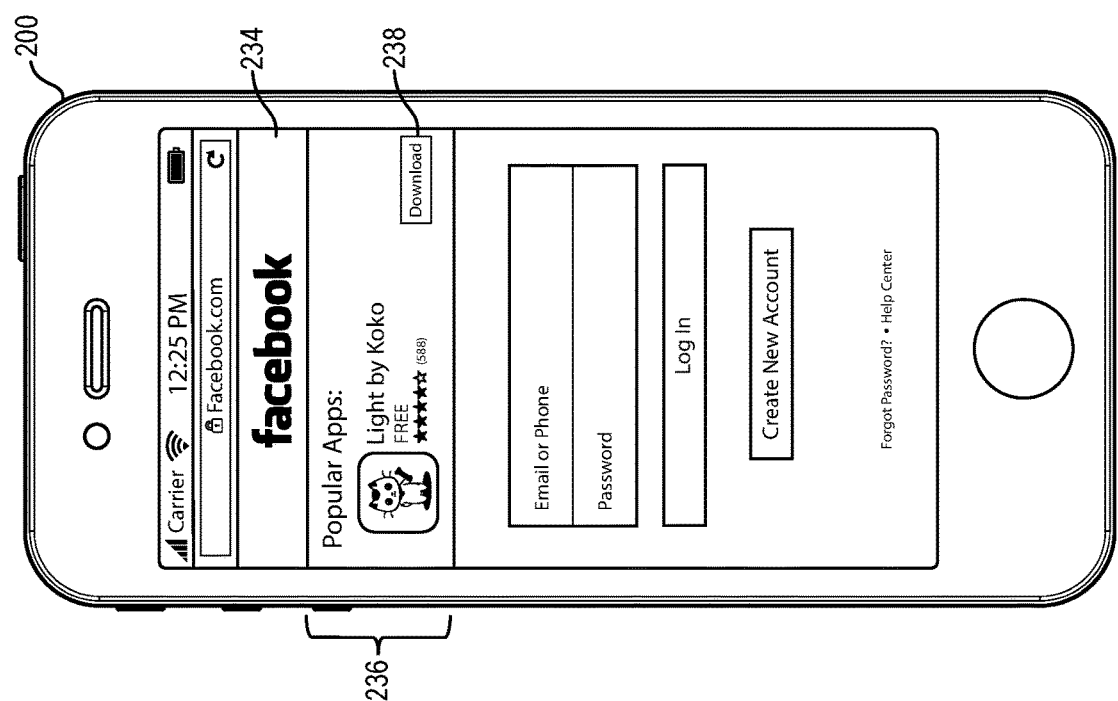

As mentioned above, the recommendation system 100 also provides application recommendations and manages downloads and installations of recommended applications via one or more webpages on the Internet, e.g., with a browser application. For example, as illustrated in FIG. 5A, the recommendation system 100 can provide an application control 236 within a website GUI 234 displayed on the client-computing device 200. In some embodiments, the recommendation system 100 provides application recommendations via one or more application controls within various websites provided by a web browser. The recommendation system 100 can provide this functionality in connection with a plug-in installed on the web browser. Alternatively, the recommendation system 100 may provide the application control 236 via the website host.

Regardless of how recommendation system provides the application control 236 to the website associated with the website GUI 234, the recommendation system 100 can manage the download and installation of an application associated with the application control 236. For example, in response to the user selecting the download control 238, as shown in FIG. 5A, the recommendation system 100 provides an application installation GUI 240a, as shown in FIG. 5B. In one or more embodiments, the recommendation system 100 provides the application installation GUI 240a as an interface superimposed over the website GUI 234. The application installation GUI 240a includes additional information about a recommended application (e.g., "Light by Koko"), and an initiation control 242.

Figure 5D:
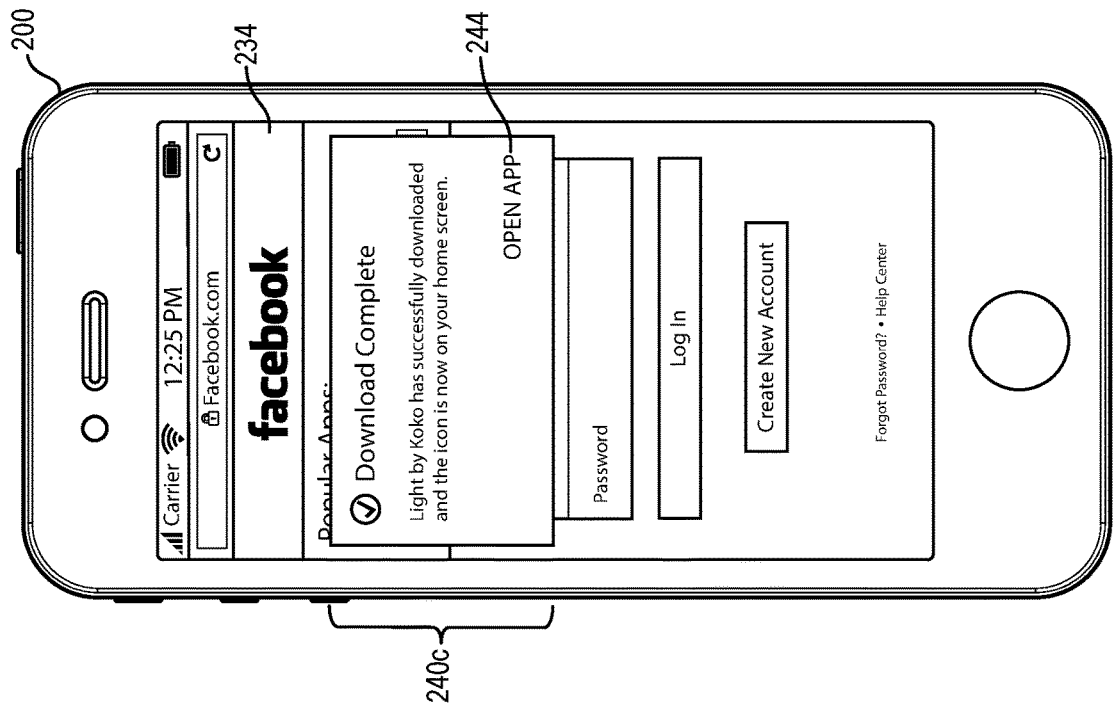
Figure 5C:
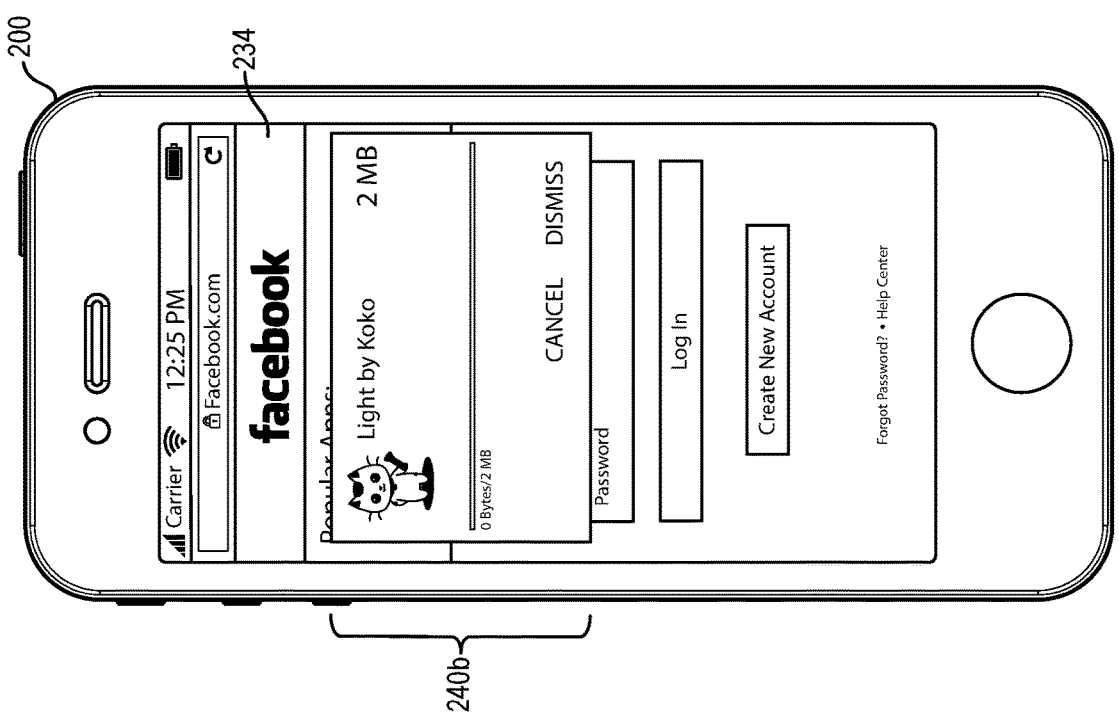

In response to the user selecting the initiation control 242, the recommendation system 100 can re-configure the application installation GUI 240a, as shown in FIG. 5B, to include download information, as shown by the application installation GUI 240*b* in FIG. 5C. As shown in FIG. 5C, the recommendation system 100 continues to display the application installation GUI 240*b* superimposed over the website GUI 234. In one or more embodiments, if the user wishes to return to the website GUI 234, the user can dismiss, minimize, or hide the application installation GUI 240*b* by tapping on the website GUI 234. Furthermore, in at least one embodiment, in response to the user selecting the initiation control 242, the recommendation manager 110 reports information associated with the corresponding application to the social networking system 122, such that the social networking system 122 can track the user's download and installation history.

When the download and/or installation of the selected application completes, the recommendation system 100 again updates the application installation GUI 240*b*, as shown in FIG. 5C, to include a completion message, as shown by the application installation GUI 240*c* in FIG. 5D. The application installation GUI 240*c*, as shown in FIG. 5D, also includes an open application control 244 that enables the user of the client-computing device 200 to voluntarily switch to the now installed application.

Figure 5F:
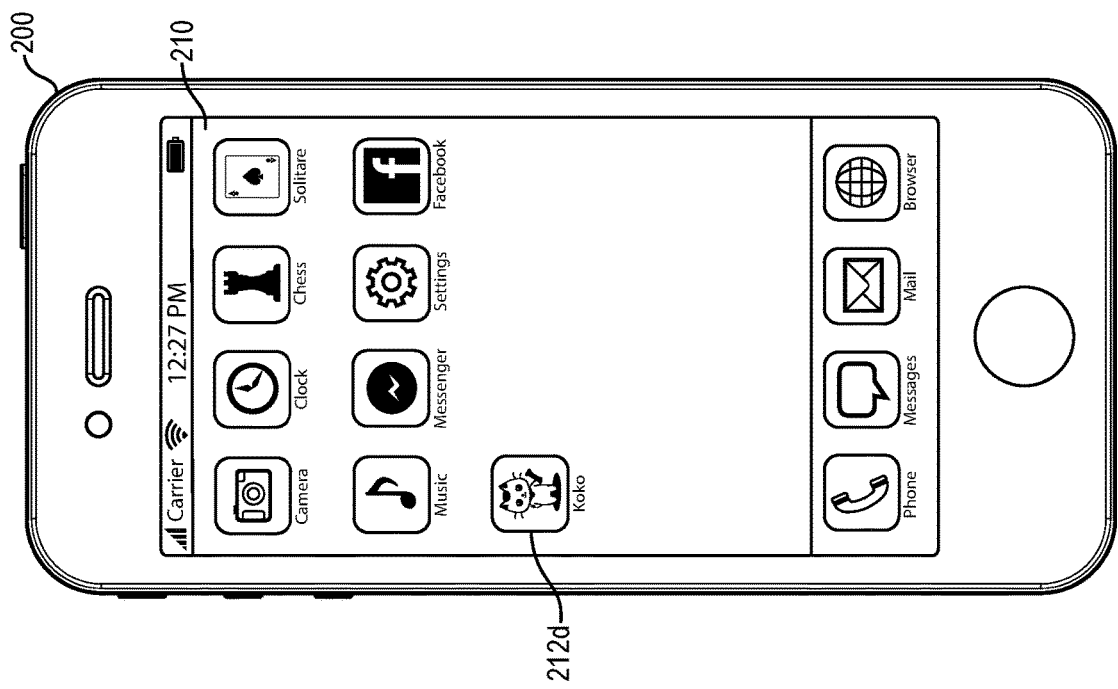
Figure 5E:
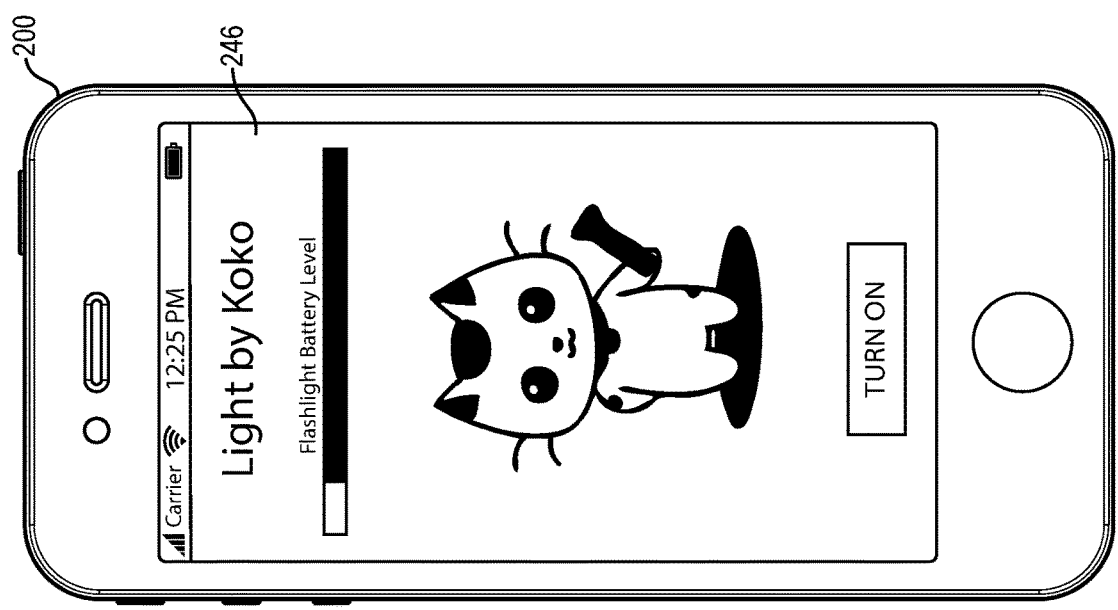

For example, as shown in FIGS. 5D and 5E, in response to the user selecting the open application control 244 in FIG. 5D, the recommendation system 100 can open the installed application, as illustrated by the application GUI 246 in FIG. 5E. Additionally, in one or more embodiments, and as illustrated in FIG. 5F, once the download and installation of the selected application is complete, the recommendation system 100 can also add an application initialization control 212*d* to the home screen GUI 210.

FIGS. 1-5F, the corresponding text, and the examples, provide a number of different methods, systems, and devices for generating application recommendations and downloading and installing selected applications on a mobile device utilizing the recommendation system 100. In addition to the foregoing, embodiment can also be described in terms of flowcharts comprising acts and steps in a method for accomplishing a particular result. For example, FIG. 6 may be performed with less or more steps/acts or the steps/acts may be performed in differing orders. Additionally, the steps/acts described herein may be repeated or performed in parallel with one another or in parallel with different instances of the same or similar steps/acts.

Figure 6:
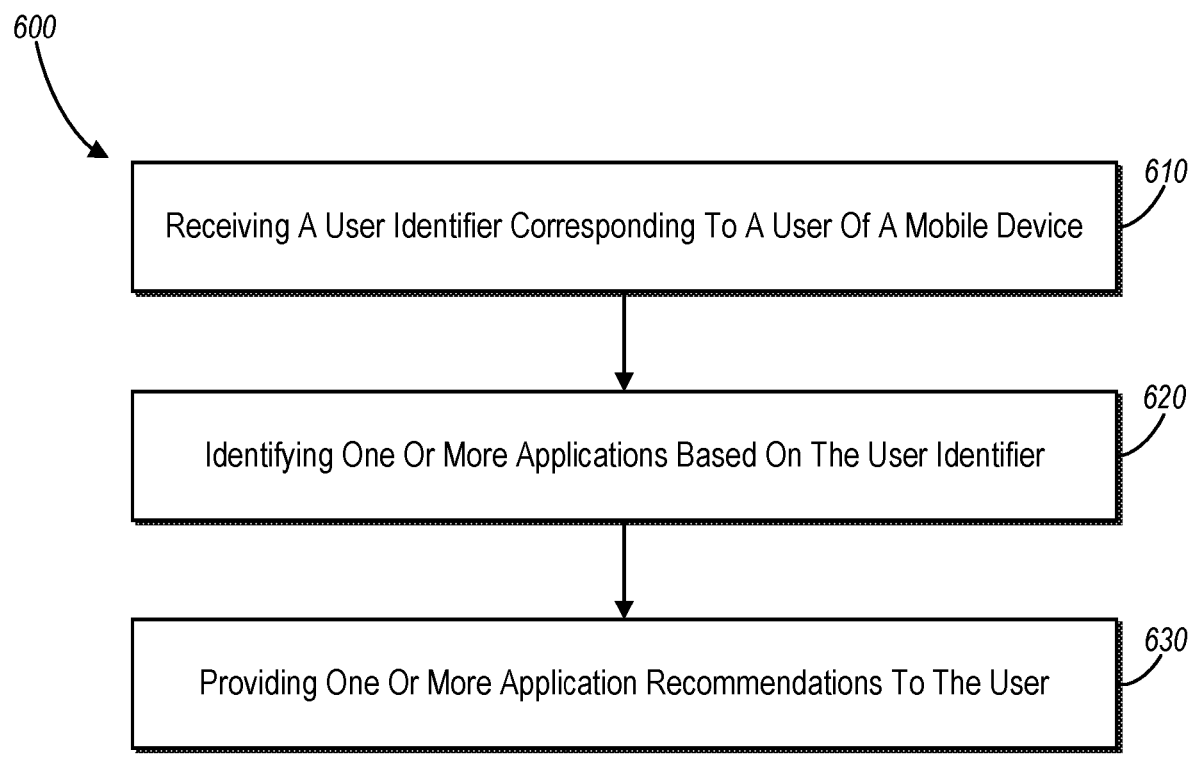
FIG. 6 illustrates a flowchart of a series of acts in a method of providing application recommendations to a user of a mobile device in accordance with one or more embodiments.

FIG. 6 illustrates a flowchart of one example method 600 of generating application recommendations on a mobile device. The method 600 includes an act 610 of receiving a user identifier corresponding to a user of a mobile device. In particular, the act 610 includes receiving, during an initial configuration of a mobile device by a user, a user identifier corresponding to the user of the mobile device. For example, in at least one embodiment, the initial configuration of the mobile device includes a process of setting up or establishing various settings associated with the mobile device. For instance, the initial configuration of the mobile device can include determining the mobile device is in a factory default setting status. In addition, the initial configuration of the mobile device can include modifying one or more factory default settings of the mobile device to customize the mobile device for use by the user. In one or more embodiments, identifying the user identifier corresponding to the user of the mobile device includes identifying one or more of a mobile phone number, an email address associated with a user of the mobile device, and a social networking system identifier associated with the user of the mobile device.

The method 600 also includes an act 620 of identifying one or more applications based on the user identifier. In particular, the act 620 includes, identifying, by at least one processor and based on the user identifier, one or more applications to recommend to the user of the mobile device during the initial configuration of the mobile device. In one or more embodiments, identifying one or more applications to install on the mobile device includes receiving social networking system information associated with the user identifier. In at least one embodiment, determining one or more applications to install on the mobile device further includes determining, based on the social networking system information, one or more likes, interests, and friends associated with the user of the mobile device; and identifying one or more applications that correspond with the one or more likes, interests, and friends associated with the user of the mobile device.

Furthermore, the method 600 includes an act 630 of providing one or more application recommendations to the user. In particular, the act 630 includes providing, for presentation to the user of the mobile device, and based on the one or more identified applications, one or more application recommendations for download and installation on the mobile device. For example, in at least one embodiment, generating one or more application recommendations for download and installation on the mobile device comprises providing a graphical user interface during the initial configuration of the mobile device comprising a selectable control associated with the one or more application recommendations. Additionally, in one or more embodiments, the act 630 further includes detecting, based on a user interaction, an indication that the user selected the selectable control corresponding to the application from the one or more application recommendations; and in response to detecting the indication that the user selected the selectable control, downloading and installing the corresponding application.

Moreover, act 630 also can include providing a graphical user interface during the initial configuration of the mobile device that comprises a selectable control associated with multiple applications from the one or more application recommendations, wherein the multiple applications associated with the selectable control are identified as belonging to a group of applications that the user has previously downloaded. Furthermore act 630 can include detecting, based on a user interaction, an indication that the user selected the selectable control associated with the multiple applications, and in response to detecting the indication that the user selected the selectable control, downloading and installing the multiple applications during the initial configuration of the mobile device.

Figure 7:
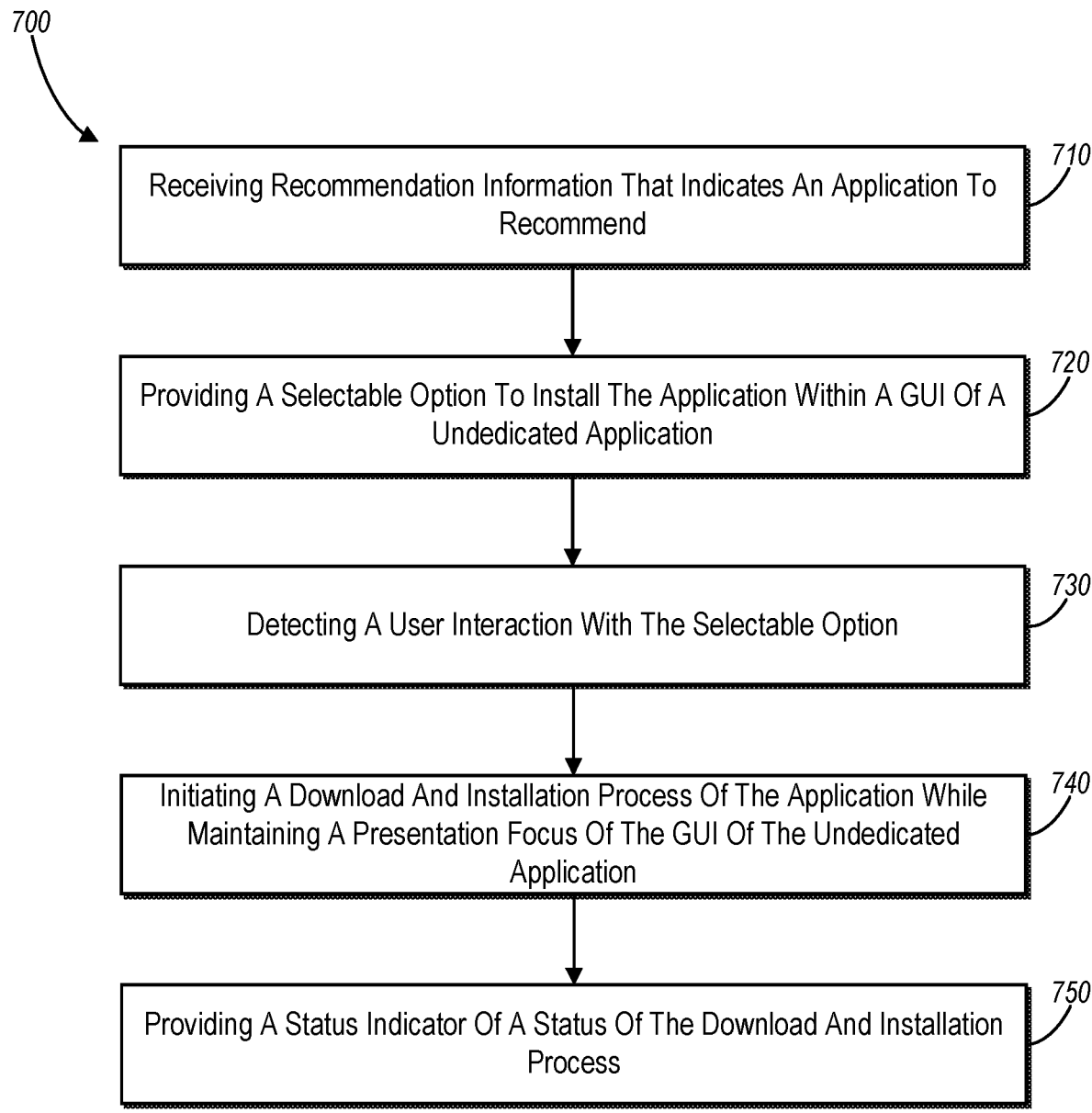
FIG. 7 illustrates a flowchart of another series of acts in a method of providing application recommendations to a user of a mobile device in accordance with one or more embodiments.

FIG. 7 illustrates a flowchart of another example method 700 of generating application recommendations on a mobile device. The method 700 includes an act 710 of receiving recommendation information that indicates an application to recommend. In particular, the act 710 includes receiving, at a client-computing device, recommendation information that indicates an application to recommend to a user of the client-computing device. In addition, act 710 can include analyzing social networking system information associated with the user, and determining, based on the analysis of the social networking system information, the application is of interest to the user. Accordingly, based on determining the application is of interest to the user, the recommendation system can send the recommendation information to the client-computing device that indicates the application to recommend to the user.

Additionally, the method 700 includes an act 720 of providing a selectable option to install the application within a graphical user interface of an undedicated application. In particular, the act 720 includes, based on receiving the recommendation information, providing, for presentation to the user within a graphical user interface of a non-dedicated application on the client-computing device, a selectable option to install the application. In one or more embodiments, wherein the undedicated application comprises one of a social networking application installed on the client-computing device and an Internet browser application installed on the client-computing device.

Moreover, act 720 can further include identifying social networking information connecting the user and the application. Moreover, act 720 can include providing, to the user within the graphical user interface, the social networking system information connecting the user and the application. In one or more embodiments, for example, the social networking information connecting the user and the application comprises a number of friends of the user within a social networking system that have downloaded the application to recommend, a geographic location corresponding to the user, a friend of the user within the social networking system that has downloaded the application, or the identification a business, group, or area of interest that the user follows and to which the application is associated (e.g., sports in general, a particular sport, or a specific sports team). Additionally, the social networking information connecting the user to the application can include: a number of users within a social networking system that share a geographic location with the user of the mobile device that have downloaded the application; a reference to an installed application that the user previously installed on the client-computing device, and a connection between the installed application and the application that is recommended; and/or a percentage of users that have installed both the installed application and the application that is recommended.

Furthermore, the method 700 includes an act 730 of detecting a user interaction with the selectable option. In particular, the act 730 involves detecting, based on a user interaction, an indication that the user interacted with the selectable option to install the application. In one or more embodiments, the act 730 further includes, in response to detecting the indication that the user interacted with the selectable option to install the application, sending data representing that the user installed the application to a social networking system.

The method 700 also includes an act 740 of initiating a download and installation process of the application while maintaining a presentation focus of the graphical user interface of the undedicated application. In particular, the act 740 includes based on detecting the indication that the user selected the selectable option, initiating a download and installation process of the application on the client-computing device while maintaining a presentation focus of the graphical user interface of the undedicated application. In at least one embodiment, initiating a download and installation process of the application on the client-computing device while maintaining a presentation focus of the social networking graphical user interface comprises downloading and installing one or more files associated with the application without switching the display of the client-computing device away from the graphical user interface of the undedicated application.

Finally, the method 700 includes an act 750 of providing a status indicator of a status of the download and installation process. In particular, the act 750 includes providing, for presentation to the user within the graphical user interface of the undedicated application, a status indicator that indicates a status of the download and installation process of the application. For example, in at least one embodiment, providing the status indicator that indicates a status of the download and installation process of the application includes at least one of providing a user interface superimposed over a portion of the social networking system graphical user interface, and providing an updating control within the social networking system graphical user interface.

In one or more embodiments, method 700 can further include determining the download and installation process of the application is complete, and based on determining the download and installation process of the application is complete, providing an option to open the application within the graphical user interface of the undedicated application. Moreover, the method 700 can also include switching the presentation focus from the undedicated application to the application based on detecting an indication of that the user selected the option to open the application.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
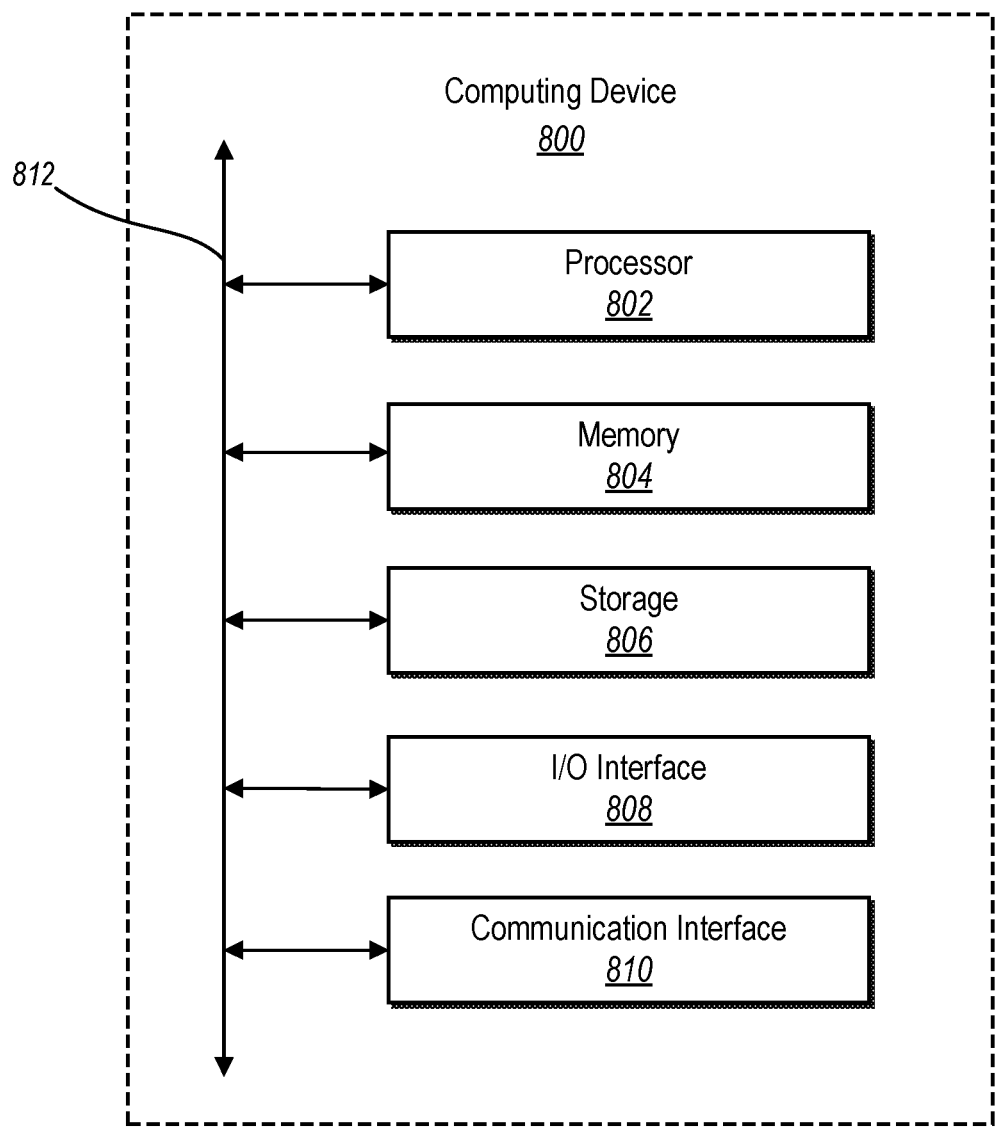
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the system 100. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, video-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 9:
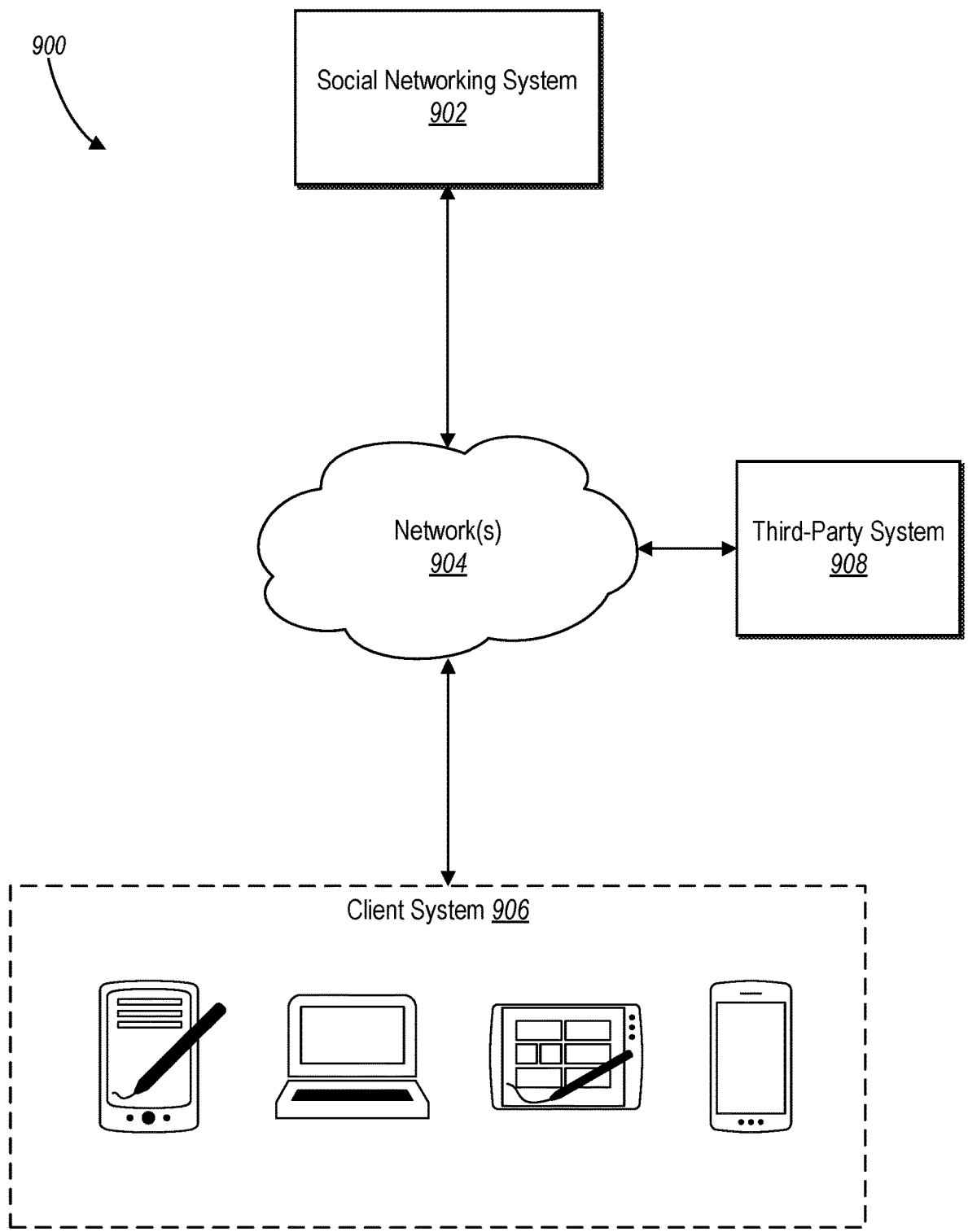
FIG. 9 is an example network environment of a social networking system in accordance with one or more embodiments.

FIG. 9 illustrates an example network environment 900 of a social networking system. Network environment 900 includes a client system 906, a social networking system 902, and a third-party system 908 connected to each other by a network 904. Although FIG. 9 illustrates a particular arrangement of client system 906, social networking system 902, third-party system 908, and network 904, this disclosure contemplates any suitable arrangement of client system 906, social networking system 902, third-party system 908, and network 904. As an example and not by way of limitation, two or more of client system 906, social networking system 902, and third-party system 908 may be connected to each other directly, bypassing network 904. As another example, two or more of client system 906, social networking system 902, and third-party system 908 may be physically or logically co-located with each other in whole or in part. Moreover, although FIG. 9 illustrates a particular number of client systems 906, social networking systems 902, third-party systems 908, and networks 904, this disclosure contemplates any suitable number of client systems 906, social networking systems 902, third-party systems 908, and networks 904. As an example and not by way of limitation, network environment 900 may include multiple client system 906, social networking systems 902, third-party systems 908, and networks 904.

This disclosure contemplates any suitable network 904. As an example and not by way of limitation, one or more portions of network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 may include one or more networks 904.

Links may connect client system 906, social networking system 902, and third-party system 908 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client system 906 may be an electronic device including hardware, software, or embedded logic components or a combination of two or more such components and capable of carrying out the appropriate functionalities implemented or supported by client system 906. As an example and not by way of limitation, a client system 906 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 906. A client system 906 may enable a network user at client system 906 to access network 904. A client system 906 may enable its user to communicate with other users at other client systems 906.

In particular embodiments, client system 906 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 906 may enter a Uniform Resource Locator (URL) or other address directing the web browser to a particular server (such as server, or a server associated with a third-party system 908), and the web browser may generate a Hyper Text Transfer Protocol (HTTP) request and communicate the HTTP request to server. The server may accept the HTTP request and communicate to client system 906 one or more Hyper Text Markup Language (HTML) files responsive to the HTTP request. Client system 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 902 may be a network-addressable computing system that can host an online social network. Social networking system 902 may generate, store, receive, and send social-networking data, such as, for example, user-profile data, concept-profile data, social-graph information, or other suitable data related to the online social network. Social networking system 902 may be accessed by the other components of network environment 900 either directly or via network 904. In particular embodiments, social networking system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 906, a social networking system 902, or a third-party system 908 to manage, retrieve, modify, add, or delete, the information stored in data store.

In particular embodiments, social networking system 902 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 902 may provide users of the online social network the ability to communicate and interact with other users. In particular embodiments, users may join the online social network via social networking system 902 and then add connections (e.g., relationships) to a number of other users of social networking system 902 whom they want to be connected to. Herein, the term "friend" may refer to any other user of social networking system 902 with whom a user has formed a connection, association, or relationship via social networking system 902.

In particular embodiments, social networking system 902 may provide users with the ability to take actions on various types of items or objects, supported by social networking system 902. As an example and not by way of limitation, the items and objects may include groups or social networks to which users of social networking system 902 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 902 or by an external system of third-party system 908, which is separate from social networking system 902 and coupled to social networking system 902 via a network 904.

In particular embodiments, social networking system 902 may be capable of linking a variety of entities. As an example and not by way of limitation, social networking system 902 may enable users to interact with each other as well as receive content from third-party systems 908 or other entities, or to allow users to interact with these entities through an application programming interfaces (API) or other communication channels.

In particular embodiments, a third-party system 908 may include one or more types of servers, one or more data stores, one or more interfaces, including but not limited to APIs, one or more web services, one or more content sources, one or more networks, or any other suitable components, e.g., that servers may communicate with. A third-party system 908 may be operated by a different entity from an entity operating social networking system 902. In particular embodiments, however, social networking system 902 and third-party systems 908 may operate in conjunction with each other to provide social-networking services to users of social networking system 902 or third-party systems 908. In this sense, social networking system 902 may provide a platform, or backbone, which other systems, such as third-party systems 908, may use to provide social-networking services and functionality to users across the Internet.

In particular embodiments, a third-party system 908 may include a third-party content object provider. A third-party content object provider may include one or more sources of content objects, which may be communicated to a client system 906. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 902 also includes user-generated content objects, which may enhance a user's interactions with social networking system 902. User-generated content may include anything a user can add, upload, send, or "post" to social networking system 902. As an example and not by way of limitation, a user communicates posts to social networking system 902 from a client system 906. Posts may include data such as status updates or other textual data, location information, photos, videos, links, music or other similar data or media. Content may also be added to social networking system 902 by a third-party through a "communication channel," such as a newsfeed or stream.

In particular embodiments, social networking system 902 may include a variety of servers, sub-systems, programs, modules, logs, and data stores. In particular embodiments, social networking system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 902 may also include suitable components such as network interfaces, security mechanisms, load balancers, failover servers, management-and-network-operations consoles, other suitable components, or any suitable combination thereof. In particular embodiments, social networking system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 902 to one or more client systems 906 or one or more third-party system 908 via network 904. The web server may include a mail server or other messaging functionality for receiving and routing messages between social networking system 902 and one or more client systems 906. An API-request server may allow a third-party system 908 to access information from social networking system 902 by calling one or more APIs. An action logger may be used to receive communications from a web server about a user's actions on or off social networking system 902. In conjunction with the action log, a third-party-content-object log may be maintained of user exposures to third-party-content objects. A notification controller may provide information regarding content objects to a client system 906. Information may be pushed to a client system 906 as notifications, or information may be pulled from client system 906 responsive to a request received from client system 906. Authorization servers may be used to enforce one or more privacy settings of the users of social networking system 902. A privacy setting of a user determines how particular information associated with a user can be shared. The authorization server may allow users to opt in to or opt out of having their actions logged by social networking system 902 or shared with other systems (e.g., third-party system 908), such as, for example, by setting appropriate privacy settings. Third-party-content-object stores may be used to store content objects received from third parties, such as a third-party system 908. Location stores may be used for storing location information received from client systems 906 associated with users. Advertisement-pricing modules may combine social information, the current time, location information, or other suitable information to provide relevant advertisements, in the form of notifications, to a user.

Figure 10:
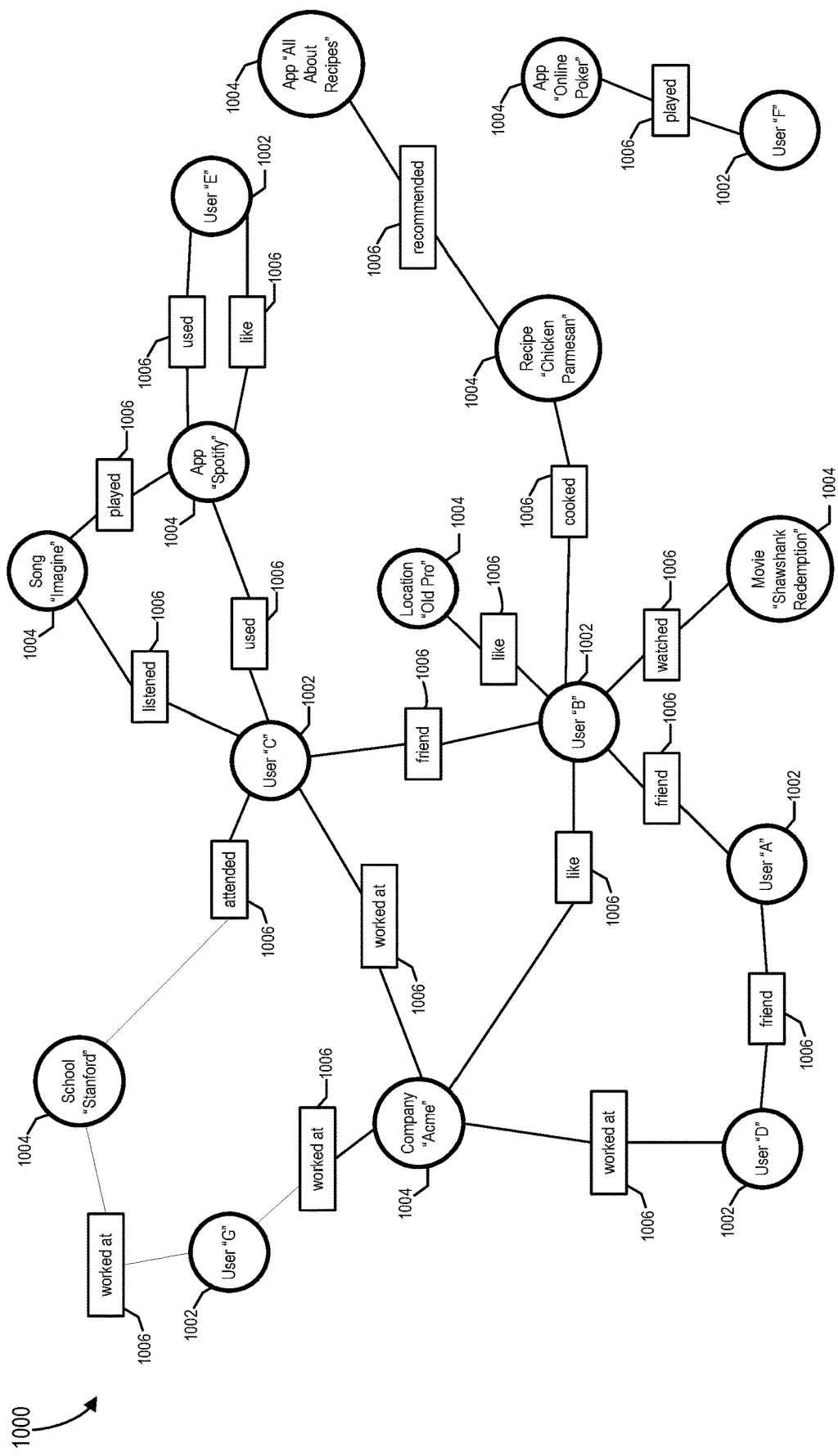
FIG. 10 illustrates a social graph in accordance with one or more embodiments.

FIG. 10 illustrates example social graph 1000. In particular embodiments, social networking system 902 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social networking system 902, client system 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social networking system 902. As an example and not by way of limitation, a user may be an individual (human user), an entity (e.g., an enterprise, business, or third-party application), or a group (e.g., of individuals or entities) that interacts or communicates with or over social networking system 902. In particular embodiments, when a user registers for an account with social networking system 902, social networking system 902 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social networking system 902. In particular embodiments, a user node 1002 may be associated with information provided by a user or information gathered by various systems, including social networking system 902. As an example and not by way of limitation, a user may provide his or her name, profile picture, contact information, birth date, sex, marital status, family status, employment, education background, preferences, interests, or other demographic information. In particular embodiments, a user node 1002 may be associated with one or more data objects corresponding to information associated with a user. In particular embodiments, a user node 1002 may correspond to one or more webpages.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 902 or a third-party website associated with a web-application server); an entity (such as, for example, a person, business, group, sports team, or celebrity); a resource (such as, for example, an audio file, video file, digital photo, text file, structured document, or application) which may be located within social networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social networking system 902. Profile pages may also be hosted on third-party websites associated with a third-party server 1008. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 906 to send to social networking system 902 a message indicating the user's action. In response to the message, social networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social networking system 902 may send a "friend request" to the second user. If the second user confirms the "friend request," social networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to a edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 906) may indicate that he or she likes the concept represented by the concept node 1004 by clicking or selecting a "Like" icon, which may cause the user's client system 906 to send to social networking system 902 a message indicating the user's liking of the concept associated with the concept-profile page. In response to the message, social networking system 902 may create an edge 1006 between user node 1002 associated with the user and concept node 1004, as illustrated by "like" edge 1006 between the user and concept node 1004. In particular embodiments, social networking system 902 may store an edge 1006 in one or more data stores. In particular embodiments, an edge 1006 may be automatically formed by social networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a newsfeed or ticker item on social networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within newsfeeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 902) or RSVP (e.g., through social networking system 902) to an event associated with the advertisement. In addition or as an alternative, an advertisement may include social-networking-system context directed to the user. As an example and not by way of limitation, an advertisement may display information about a friend of the user within social networking system 902 who has taken an action associated with the subject matter of the advertisement.

In particular embodiments, social networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1008 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 902 may calculate a coefficient based on a user's actions. Social networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social networking system 902 may analyze a user's actions to determine whether one or more of the actions indicate an affinity for subject matter, content, other users, and so forth. As an example and not by way of limitation, if a user may make frequently posts content related to "coffee" or variants thereof, social networking system 902 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 902 may calculate a coefficient based on the type of relationship between particular objects. Referencing the social graph 1000, social networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than a user node 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 902 may determine that the user has a higher coefficient with respect to the first photo than the second photo because having a tagged-in-type relationship with content may be assigned a higher weight and/or rating than having a like-type relationship with content. In particular embodiments, social networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 902 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 906 of the user). A first user may be more interested in other users or concepts that are closer to the first user. As an example and not by way of limitation, if a user is one mile from an airport and two miles from a gas station, social networking system 902 may determine that the user has a higher coefficient for the airport than the gas station based on the proximity of the airport to the user.

In particular embodiments, social networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 902 may provide information that is relevant to user's interests and current circumstances, increasing the likelihood that they will find such information of interest. In particular embodiments, social networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social networking system 902 may calculate the coefficient (or access the coefficient information if it has previously been calculated and stored). In particular embodiments, social networking system 902 may measure an affinity with respect to a particular process. Different processes (both internal and external to the online social network) may request a coefficient for a particular object or set of objects. Social networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 902 may send a request to the data store for the object. The request may identify the user associated with the request and may only be sent to the user (or a client system 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   receiving, during an initial configuration of a mobile device by a user, a user identifier corresponding to the user of the mobile device;
   identifying, by at least one processor and based on the user identifier, a first application not previously installed by the user to recommend to the user of the mobile device during the initial configuration of the mobile device;
   identifying, by the at least one processor, social networking system information associated with all social networking system users within a social networking system who have downloaded and installed the first application, wherein the social networking system information corresponds to a relevancy for identifying the first application as a recommendation for the user of the mobile device;
   identifying, by the at least one processor and based on the user identifier, a second application the user previously installed on a different mobile device to recommend to the user of the mobile device during the initial configuration of the mobile device; and
   providing, for presentation to the user of the mobile device within a single display and during the initial configuration of the mobile device, application recommendations comprising the first application not previously installed by the user, the social networking system information associated with all the social networking system users within the social networking system who have downloaded and installed the first application, and the second application the user previously installed on the different mobile device.

2. The method as recited in claim 1, wherein the initial configuration of the mobile device by the user comprises:
   determining the mobile device is in a factory default setting status; and
   modifying one or more factory default settings of the mobile device to customize the mobile device for use by the user.

3. The method as recited in claim 1, wherein receiving the user identifier corresponding to the user of the mobile device comprises identifying at least one of a mobile phone number, an email address, or a social networking system identifier.

4. The method as recited in claim 1, wherein the social networking system information comprises at least one of demographic information associated with social networking users from all the social networking system users who have downloaded and installed the first application, subject matter associated with the first application, or social networking system activity in common among the social networking system users who have downloaded and installed the first application.

5. The method as recited in claim 1, wherein identifying the first application further comprises:
   determining, based on the social networking system information, one or more likes, interests, or friends associated with the user of the mobile device; and
   identifying at least one application that corresponds with the one or more likes, interests, or friends associated with the user of the mobile device.

6. The method as recited in claim 1, wherein providing, within the single display, application recommendations further comprises providing a first selectable control associated with the first application adjacent to the social networking system information associated with all the social networking system users within the social networking system who have downloaded and installed the first application, and a second selectable control associated with the second application.

7. The method as recited in claim 6, further comprising:
   detecting, based on a user interaction, an indication of a user selection of at least one of the first selectable control and the second selectable control; and
   in response to detecting the indication of the user selection, downloading and installing at least one of the first application and the second application.

8. The method as recited in claim 1, further comprising:
   providing, within the single display, a single selectable control associated with both the first application and the second application;
   detecting, based on a user interaction, an indication of a user selection of the single selectable control associated with the both the first application and the second application; and in response to detecting the indication of the user selection, downloading and installing both the first application and the second application during the initial configuration of the mobile device.

9. A system comprising:
at least one processor; and
at least one non-transitory computer-readable storage medium storing instructions thereon that, when executed by the at least one processor, cause the system to:
receive, during an initial configuration of a mobile device by a user, a user identifier corresponding to the user of the mobile device;
identify, based on the user identifier, a first application not previously installed by the user to recommend to the user of the mobile device during the initial configuration of the mobile device;
identifying social networking system information associated with all social networking system users within a social networking system who have downloaded and installed the first application, wherein the social networking system information corresponds to a relevancy for identifying the first application as a recommendation for the user of the mobile device;
identify, based on the user identifier, a second application the user previously installed on a different mobile device to recommend to the user of the mobile device during the initial configuration of the mobile device; and
provide, for presentation to the user of the mobile device within a single display and during the initial configuration of the mobile device, application recommendations comprising the first application not previously installed by the user, the social networking system information associated with all the social networking system users within the social networking system who have downloaded and installed the first application, and the second application the user previously installed on the different mobile device.

10. The system as recited in claim 9, wherein receiving the user identifier corresponding to the user of the mobile device comprises identifying at least one of a mobile phone number, an email address, or a social networking system identifier.

11. The system as recited in claim 10, wherein the instructions that cause the system to identify the first application further cause the system to:
determine, based on the user identifier, one or more likes, interests, or friends associated with the user of the mobile device; and
identify at least one application that corresponds with the one or more likes, interests, or friends associated with the user of the mobile device.

12. The system as recited in claim 11, wherein providing, within the single display, application recommendations further comprises providing a first selectable control associated with the first application adjacent to the social networking system information associated with all the social networking system users within the social networking system who have downloaded and installed the first application, and a second selectable control associated with the second application.

13. The system as recited in claim 12, further comprising instructions that, when executed by the at least one processor, cause the system to:
detect, based on a user interaction, an indication of a user selection of at least one of the first selectable control and the second selectable control; and in response to detecting the indication of the user selection, download and install at least one of the first application and the second application.

14. The system as recited in claim 9, further comprising instructions that, when executed by the at least one processor, cause the system to provide, within the single display, a single selectable control associated with both the first application and the second application.

15. A non-transitory computer readable medium storing instructions thereon that, when executed by at least one processor, cause a computer system to:
receive, during an initial configuration of a mobile device by a user, a user identifier corresponding to the user of the mobile device;
identify, based on the user identifier, a first application not previously installed by the user to recommend to the user of the mobile device during the initial configuration of the mobile device;
identify social networking system information associated with all social networking system users within a social networking system who have downloaded and installed the first application, wherein the social networking system information corresponds to a relevancy for identifying the first application as a recommendation for the user of the mobile device;
identify, based on the user identifier, a second application the user previously installed on a different mobile device to recommend to the user of the mobile device during the initial configuration of the mobile device; and
provide, for presentation to the user of the mobile device within a single display and during the initial configuration of the mobile device, application recommendations comprising the first application not previously installed by the user, the social networking system information associated with all the social networking system users within the social networking system who have downloaded and installed the first application, and the second application the user previously installed on the different mobile device.

16. The non-transitory computer readable medium as recited in claim 15, wherein the instructions that cause the computer system to identify the first application further cause the computer system to:
access social networking system information associated with the user identifier;
access application information that defines one or more characteristics of available applications; and
identify, based on an analysis of the social networking system information and the application information, the first application.

17. The non-transitory computer readable medium as recited in claim 15, wherein the instructions that cause the computer system to identify the second application further cause the computer system to determine the second application the user previously installed on the different mobile device based on social networking system information.

18. The non-transitory computer readable medium as recited in claim 17, wherein the instructions that cause the computer system to provide the application recommendations comprising the first application and the second application further cause the computer system to provide, for presentation to the user of the mobile device, the application recommendations organized in a not previously installed grouping and a previously installed grouping.

19. The non-transitory computer readable medium as recited in claim 18, further comprising instructions that, when executed by the at least one processor, cause the computer system to provide the social networking system information associated with all the social networking system users within the social networking system who have downloaded and installed the first application by providing one or more of: demographic information associated with the users who have downloaded and installed the first application, subject matter associated with the first application, and social networking system activity in common among the social networking system users who have downloaded and installed the first application.

20. The non-transitory computer readable medium as recited in claim 19, further comprising instructions that, when executed by the at least one processor, cause the computer system to:
   provide within the single display, a single selectable control associated with both the first application and the second application; and
   in response to detecting an indication of a user selection of the single selectable control, download and install the both the first application and the second application during the initial configuration of the mobile device.

\* \* \* \* \*